(12) United States Patent
Park et al.

(10) Patent No.: US 10,595,212 B2
(45) Date of Patent: Mar. 17, 2020

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/322,915

(22) PCT Filed: Jul. 17, 2017

(86) PCT No.: PCT/KR2017/007665
§ 371 (c)(1),
(2) Date: Feb. 1, 2019

(87) PCT Pub. No.: WO2018/016827
PCT Pub. Date: Jan. 25, 2018

(65) Prior Publication Data
US 2019/0174328 A1 Jun. 6, 2019

Related U.S. Application Data

(60) Provisional application No. 62/363,346, filed on Jul. 18, 2016, provisional application No. 62/364,871,
(Continued)

(51) Int. Cl.
*H04W 16/28* (2009.01)
*H04L 27/26* (2006.01)
(Continued)

(52) U.S. Cl.
CPC ............. *H04W 16/28* (2013.01); *H04L 27/26* (2013.01); *H04W 72/04* (2013.01); *H04W 84/12* (2013.01)

(58) Field of Classification Search
CPC .... H04B 7/0695; H04B 7/0617; H04B 7/088; H04W 16/28; H04W 72/04
See application file for complete search history.

(56) References Cited

U.S. PATENT DOCUMENTS

2015/0339137 A1 11/2015 Andrus et al.
2015/0373587 A1 12/2015 Josiam et al.
(Continued)

OTHER PUBLICATIONS

Alecsander Eitan et al., 'PHY Frame Format proposal for 11 ay', IEEE 02.11-16/0061-00-00, Jan. 18, 2016. See pp. 5, 11. (Year: 2016).*
Assaf Kasher, 'Beamforming Training proposals', IEEE 802.11-16/0103r0, Jan. 18, 2016. See p. 8. (Year: 2016).*
Hiroyuki et al., 'Aggregation based channel bonding', IEEE 802.11-16/0074r0, Jan. 17, 2016. See slide 3. (Year: 2016).*
(Continued)

*Primary Examiner* — Shukri Taha
(74) *Attorney, Agent, or Firm* — Lee Hong Degerman Kang Waimey

(57) ABSTRACT

The present specification discloses a method by which a station transmits/receives a signal in a wireless LAN (WLAN) system, and a device therefor. More particularly, disclosed are: a method for performing beamforming training for a plurality of channels and transmitting/receiving a signal on the basis of the beamforming training, when the station transmits/receives the signal through the plurality of channels; and a device therefor.

12 Claims, 45 Drawing Sheets

Related U.S. Application Data filed on Jul. 21, 2016, provisional application No. 62/369,764, filed on Aug. 2, 2016, provisional application No. 62/376,499, filed on Aug. 18, 2016.

(51) Int. Cl.
  *H04W 84/12* (2009.01)
  *H04W 72/04* (2009.01)

(56) References Cited

U.S. PATENT DOCUMENTS

| | | | |
|---|---|---|---|
| 2016/0164800 A1* | 6/2016 | Eitan | H04L 47/80 |
| 2016/0309457 A1* | 10/2016 | Eitan | H04L 1/0079 |
| 2016/0323755 A1* | 11/2016 | Cordeiro | H04J 13/0014 |
| 2016/0323861 A1* | 11/2016 | Cordeiro | H04B 7/0452 |
| 2017/0207905 A1* | 7/2017 | Eitan | H04L 1/008 |
| 2018/0006705 A1* | 1/2018 | Cariou | H04L 69/28 |

OTHER PUBLICATIONS

James et al., '11ay MIMO BF Training Enhancements', IEEE 802.11-16/0100r3, Mar. 14, 2016. See slides 5, 8. (Year: 2016).*

PCT International Application No. PCT/KR2017/007665, International Search Report dated Oct. 23, 2017, 3 pages.

Wang, J. et al., "11ay MIMO BF Training Enhancements," doc.: IEEE 802.11-16/0100r3, Jan. 2016, 16 pages.

Motozuka, H. et al., "Aggregation based channel bonding," doc.: IEEE 802.11-16/0074r0, Jan. 2016, 10 pages.

Kasher, A., "Beamforming Training proposals," doc.: IEEE 802.11-16/0103r0, Jan. 2016, 15 pages.

European Patent Office Application Serial No. 17831300.3, Search Report dated Dec. 20, 2019, 10 pages.

Saishankar et al., "WiGig and IEEE 802.11ad for Multi-Gigabyte-Per-Second WPAN and WLAN", XP055526872, Nov. 2012, 24 pages.

* cited by examiner

FIG. 9

| CH 1 | L - STF | L - CE | L - Header | ay Header A | ay STF | ay CE | ay Header B | ay payload |
|---|---|---|---|---|---|---|---|---|
| | GF-STF | GF-CE | | | | | | |
| CH 2 | L - STF | L - CE | L - Header | ay Header A | | | | |

(L: Legacy, GF: Gap Filling, ay: 802.11ay)

FIG. 21

| CH1 | L-STF | L-CE | L-Header | Short SSW or SSW |

| CH2 | L-STF | L-CE | L-Header | Short SSW or SSW |

FIG. 22

| CH1 | L-STF | L-CE | L-Header | Short SSW or SSW | EDMG STF | EDMG CE |
|---|---|---|---|---|---|---|
| CH2 | L-STF | L-CE | L-Header | Short SSW or SSW | | |

FIG. 23

| CH1 | L-STF | L-CE | L-Header | EDMG Header A | EDMG STF | EDMG CE | Short SSW or SSW |
|-----|-------|------|----------|---------------|----------|---------|------------------|
| CH2 | L-STF | L-CE | L-Header | EDMG Header A | | | |

FIG. 24

| CH1 | L-STF | L-CE | L-Header | EDMG Header A | EDMG STF | EDMG CE | Short SSW or SSW | TRN |
|---|---|---|---|---|---|---|---|---|
| CH2 | L-STF | L-CE | L-Header | EDMG Header A | | | | |

(a)

| CH1 | L-STF | L-CE | L-Header | Short SSW or SSW | TRN |
|---|---|---|---|---|---|
| CH2 | L-STF | L-CE | L-Header | Short SSW or SSW | |

(b)

| CH1 | L-STF | L-CE | L-Header | Short SSW or SSW | TRN |
|---|---|---|---|---|---|
| CH2 | L-STF | L-CE | L-Header | Short SSW or SSW | TRN |

| CH1 | L-STF | L-CE | L-Header | EDMG Header A | EDMG STF | EDMG CE | BRP | TRN |
|---|---|---|---|---|---|---|---|---|
| CH2 | L-STF | L-CE | L-Header | EDMG Header A | | | | |

FIG. 26

| CH1 | L-STF | L-CE | L-Header | BRP | |
|---|---|---|---|---|---|
| | | | | | TRN |
| CH2 | L-STF | L-CE | L-Header | BRP | |

FIG. 27

| CH1 | L-STF | L-CE | L-Header | BRP | TRN |
|---|---|---|---|---|---|

| CH2 | L-STF | L-CE | L-Header | BRP | TRN |
|---|---|---|---|---|---|

FIG. 28

| CH1 | L-STF | L-CE | L-Header | EDMG Header A | BRP | TRN |

| CH2 | L-STF | L-CE | L-Header | EDMG Header A | BRP | TRN |

FIG. 29

| CH1 | L-STF | L-CE | L-Header | EDMG Header A | BRP | TRN |
|---|---|---|---|---|---|---|
| CH2 | L-STF | L-CE | L-Header | EDMG Header A | BRP | |

FIG. 30

| CH1 | L-STF | L-CE | L-Header | EDMG Header A | Short SSW or SSW |

| CH2 | L-STF | L-CE | L-Header | EDMG Header A | Short SSW or SSW |

FIG. 31

| CH1 | L-STF | L-CE | L-Header | Short SSW or SSW |

| CH2 | L-STF | L-CE | L-Header | Short SSW or SSW |

FIG. 33

| CH1 | L-STF | L-CE | L-Header | BRP | TRN |
|---|---|---|---|---|---|
| CH2 | L-STF | L-CE | L-Header | BRP | |
| CH3 | L-STF | L-CE | L-Header | BRP | TRN |

FIG. 34

| CH1 | L-STF | L-CE | L-Header | EDMG Header A | BRP | |
|---|---|---|---|---|---|---|
| | | | | | | TRN |
| CH2 | L-STF | L-CE | L-Header | EDMG Header A | BRP | |

| CH3 | L-STF | L-CE | L-Header | EDMG Header A | BRP | TRN |

SIGNAL TRANSMISSION/RECEPTION METHOD IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2017/007665, filed on Jul. 17, 2017, which claims the benefit of U.S. Provisional Application No. 62/363,346, filed on Jul. 18, 2016, 62/364,871, filed on Jul. 21, 2016, 62/369,764, filed on Aug. 2, 2016, and 62/376,499, filed on Aug. 18, 2016, the contents of which are all hereby incorporated by reference herein in their entireties.

BACKGROUND OF THE INVENTION

Field of the Invention

The following description relates to a signal transmission/reception method of a station in a wireless LAN (WLAN) system and, more particularly, to a method of performing beamforming training on multiple channels, in case a station transmits and/or receives a signal through the multiple channels, and a method of transmitting/receiving a signal based on the beamforming training and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

Technical Objects

In a 11ay system that can apply the present invention, a station may transmit and/or receive a signal through multiple channels.

At the point, the present invention proposes a method of performing beamforming training by the station on the multiple channels and a method for transmitting and/or receiving a signal based on the beamforming training and a device for the same.

Technical Solutions

In order to achieve the above-described object of the present invention, in an aspect of the present invention, proposed herein is a method for transmitting a signal by a first station (STA) to a second station (STA) through multiple channels in a wireless LAN (WLAN) system including the steps of performing beamforming training on the multiple channels for the second STA, by transmitting a Physical Protocol Data Unit (PPDU) to the second STA, wherein the PPDU have different structures based on whether a signal transmission method the multiple channels is channel bonding or channel aggregation, and transmitting the signal through the multiple channels to the second STA based on the beamforming training result, wherein, in case the signal transmission method through the multiple channels is the channel aggregation, the PPDU includes a Legacy Shot Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated and transmitted for each of aggregated channels, and the PPDU includes a Training (TRN) field having a gap configured between the aggregated channels, and wherein, in case the signal transmission method through the multiple channels is the channel bonding, the PPDU includes a L-STF field, a L-CE field, a L-Header field, an EDMG Header A field, and a BRP field, which are duplicated and transmitted for each of bonded channels, and the PPDU includes a TRN field being transmitted through an entire bandwidth of the bonded channels.

In response to this, in another aspect of the present invention, proposed herein is a method for receiving a signal by a first station (STA) from a second station (STA) through multiple channels in a wireless LAN (WLAN) system including the steps of performing beamforming training on the multiple channels for the second STA, by receiving a Physical Protocol Data Unit (PPDU) from the second STA, wherein the PPDU have different structures based on whether a signal transmission method the multiple channels is channel bonding or channel aggregation, and receiving the signal through the multiple channels from the second STA based on the beamforming training result, wherein, in case the signal transmission method through the multiple channels is the channel aggregation, the PPDU includes a Legacy Shot Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated and transmitted for each of aggregated channels, and the PPDU includes a Training (TRN) field having a gap configured between the aggregated channels, and wherein, in case the signal transmission method through the multiple channels is the channel bonding, the PPDU includes a L-STF field, a L-CE field, a L-Header field, an EDMG Header A field, and a BRP field, which are duplicated and transmitted for each of bonded channels, and the PPDU includes a TRN field being transmitted through an entire bandwidth of the bonded channels.

According to the above-described method for transmitting the signal or signal reception method, the PPDU may be configured by an order of the L-STF field, the L-CE field, the L-Header field, the EDMG Header A field, the BRP field, and the TRN field in a time domain.

At this point, in case the signal transmission method through the multiple channels may be channel bonding, the channel bonding includes 2-channel bonding to 4-channel bonding.

Additionally, in case the signal transmission method through the multiple channels is channel aggregation, the channel aggregation may include a 2-channel aggregation or a 4-channel aggregation.

Most particularly, the PPDU may not include an EDMG-STF field, an EDMG-CE field, and an EDMG Header-B field.

According to yet another aspect of the present invention, proposed herein is a station device for transmitting a signal through multiple channels in a wireless LAN (WLAN) system including a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device. Herein, the processor may be configured to perform beamforming training on the multiple channels for the second STA, by transmitting a Physical Protocol Data Unit (PPDU) to the second STA, wherein the PPDU have different structures based on whether a signal transmission method the multiple channels is channel bonding or channel aggregation, and to transmit the signal through the multiple channels to the second STA based on the beamforming training result, wherein, in case the signal transmission method through the multiple channels is the channel aggregation, the PPDU includes a Legacy Shot Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated and transmitted for each of aggregated channels, and the PPDU includes a Training (TRN) field having a gap configured between the aggregated channels, and wherein, in case the signal transmission method through the multiple channels is the channel bonding, the PPDU includes a L-STF field, a L-CE field, a L-Header field, an EDMG Header A field, and a BRP field, which are duplicated and transmitted for each of bonded channels, and the PPDU includes a TRN field being transmitted through an entire bandwidth of the bonded channels.

According to a further aspect of the present invention, proposed herein is a station device for receiving a signal through multiple channels in a wireless LAN (WLAN) system including a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device. Herein, the processor may be configured to perform beamforming training on the multiple channels for the second STA, by receiving a Physical Protocol Data Unit (PPDU) from the second STA, wherein the PPDU have different structures based on whether a signal transmission method the multiple channels is channel bonding or channel aggregation, and to receive the signal through the multiple channels from the second STA based on the beamforming training result, wherein, in case the signal transmission method through the multiple channels is the channel aggregation, the PPDU includes a Legacy Shot Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated and transmitted for each of aggregated channels, and the PPDU includes a Training (TRN) field having a gap configured between the aggregated channels, and wherein, in case the signal transmission method through the multiple channels is the channel bonding, the PPDU includes a L-STF field, a L-CE field, a L-Header field, an EDMG Header A field, and a BRP field, which are duplicated and transmitted for each of bonded channels, and the PPDU includes a TRN field being transmitted through an entire bandwidth of the bonded channels.

Effects of the Invention

By having the above-described configuration, the station according to the present invention may perform beamforming training on multiple channels, and the station may also be capable of transmitting/receiving signals with higher reliability based on the beamforming training.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

FIG. 21 is a diagram showing a PPDU format for beamforming training applying a channel bonding method according to a first exemplary embodiment of the present invention.

FIG. 22 is a diagram showing a PPDU format for beamforming training applying a channel bonding method according to a second exemplary embodiment of the present invention.

FIG. 23 is a diagram showing a PPDU format for beamforming training applying a channel bonding method according to a third exemplary embodiment of the present invention.

FIG. 24 is a diagram showing a PPDU format including a TRN field according to an exemplary embodiment of the present invention.

FIG. 25 to FIG. 29 are diagrams respectively showing a PPDU format including a TRN field according to another exemplary embodiment of the present invention.

FIG. 30 is a diagram showing a PPDU format for beamforming training applying a channel aggregation method according to a first exemplary embodiment of the present invention.

FIG. 31 is a diagram showing a PPDU format for beamforming training applying a channel aggregation method according to a second exemplary embodiment of the present invention.

FIG. 33 and FIG. 34 are diagrams respectively showing a PPDU format for beamforming training applying a FDMA method according to another exemplary embodiment of the present invention.

FIG. 35 to FIG. 37 are diagrams showing sequences being transmitted from each of an AGC subfield, a CE subfield, and a TRN-T/R subfield, in case the TRN field corresponds to one channel bandwidth.

FIG. 38 to FIG. 40 are diagrams showing sequences being transmitted from each of an AGC subfield, a CE subfield, and a TRN-T/R subfield, in case the TRN field corresponds to two channel bandwidths.

FIG. 41 to FIG. 43 are diagrams showing sequences being transmitted from each of an AGC subfield, a CE subfield, and a TRN-T/R subfield, in case the TRN field corresponds to four channel bandwidths.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
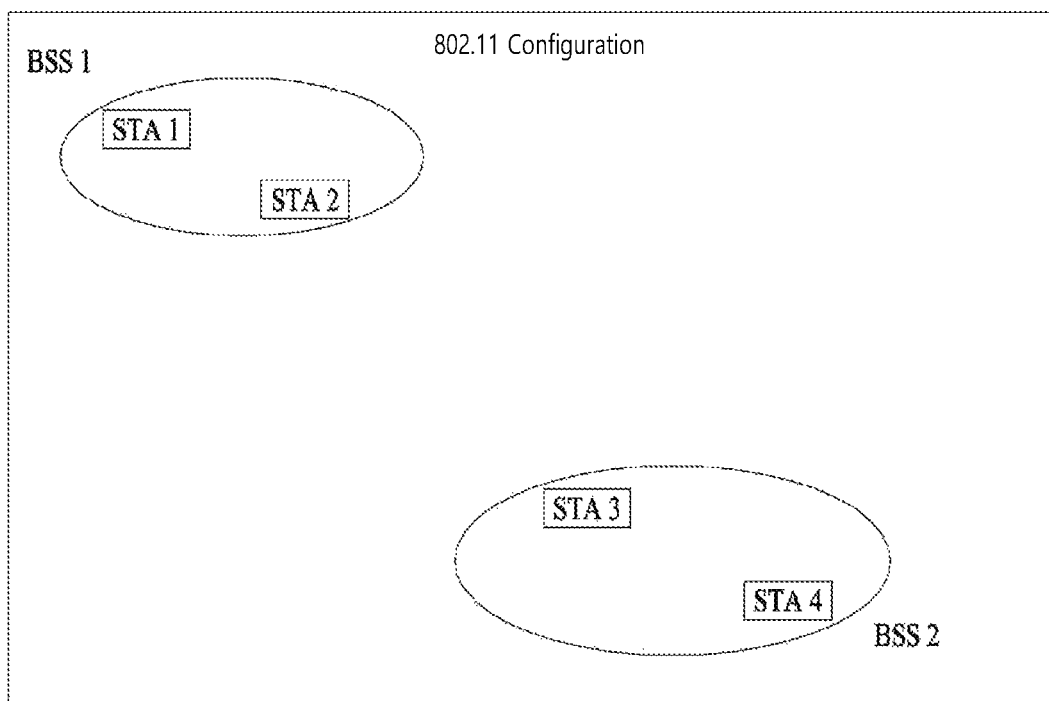
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
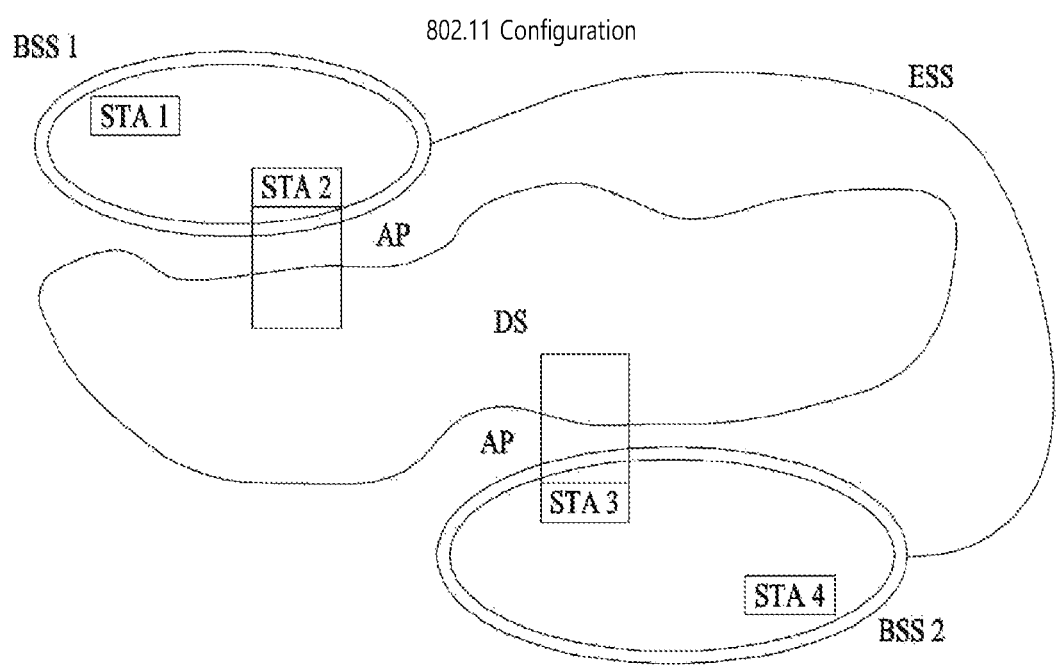
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
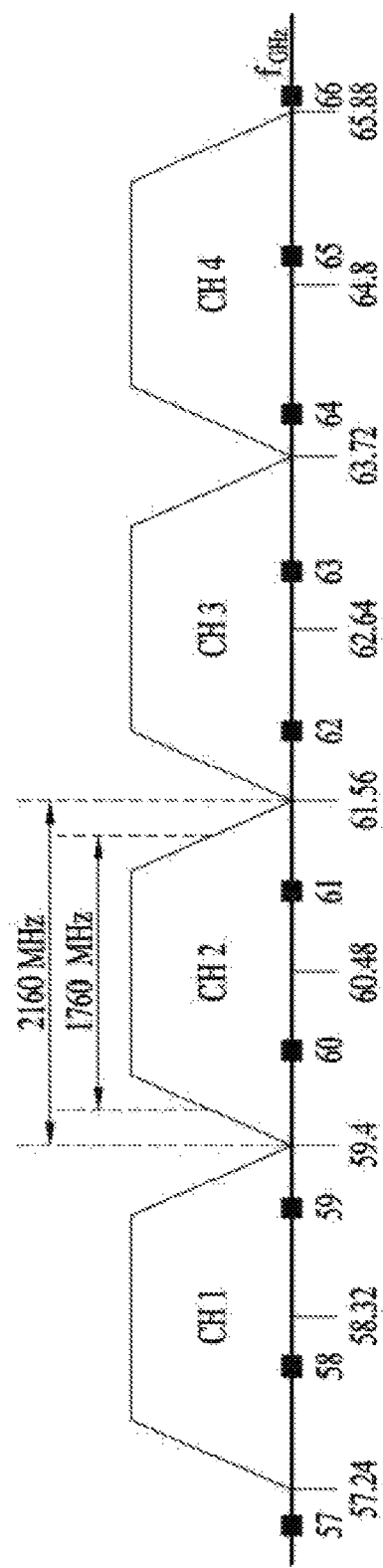
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
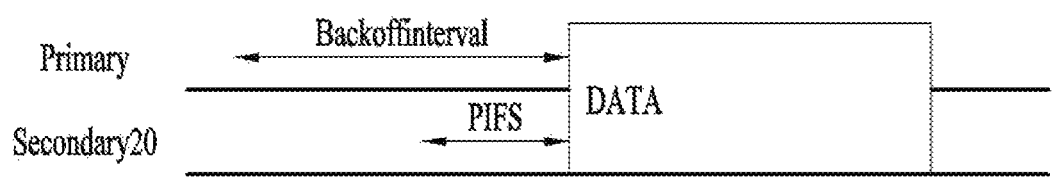
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
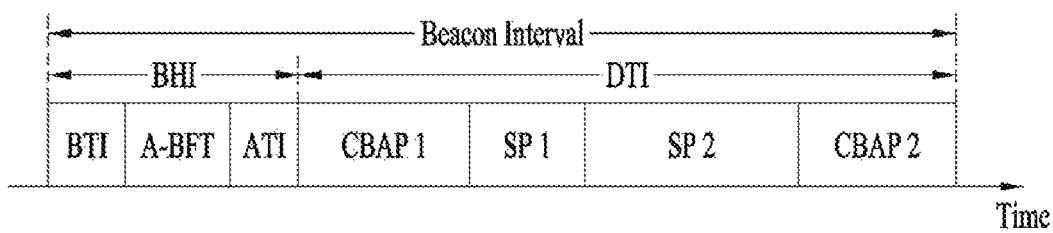
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY | 1 ... 12 | (low power SC PHY) |
| (SC PHY) | 25 ... 31 | |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
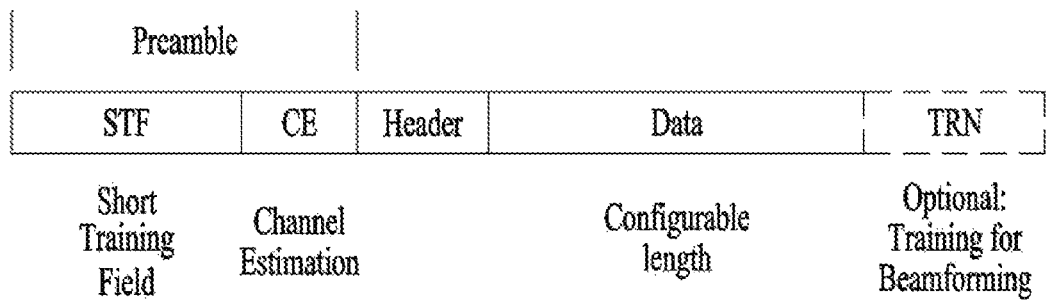
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
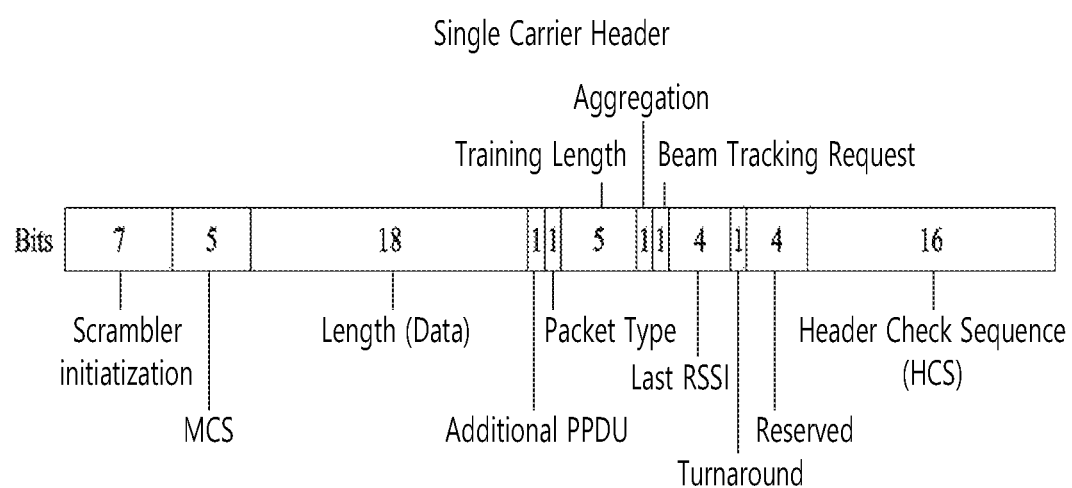
FIG. 7 and FIG. 8 are diagrams describing a configuration of a header field of the radio frame shown in FIG. 6.
Figure 8:
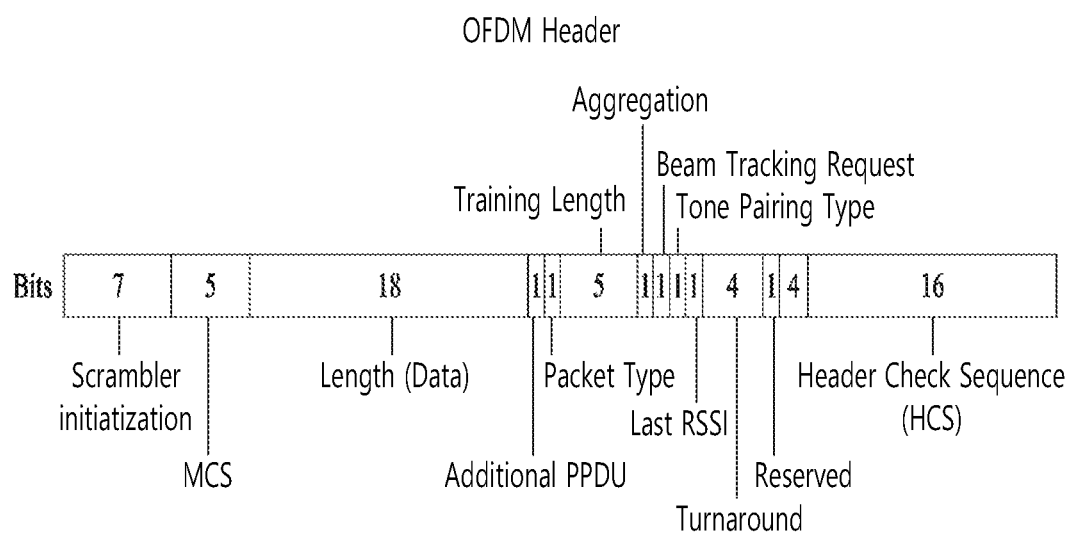

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using/based on the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
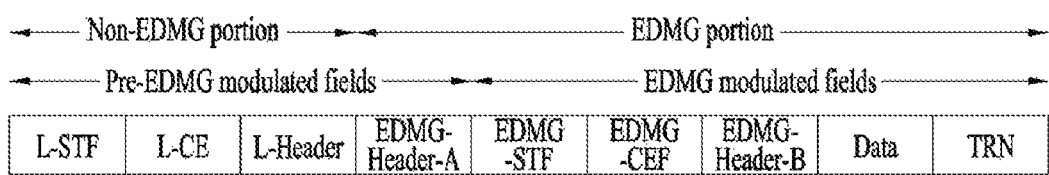
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

3. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

3.1. Performing Beamforming for Only One Channel

Figure 11:
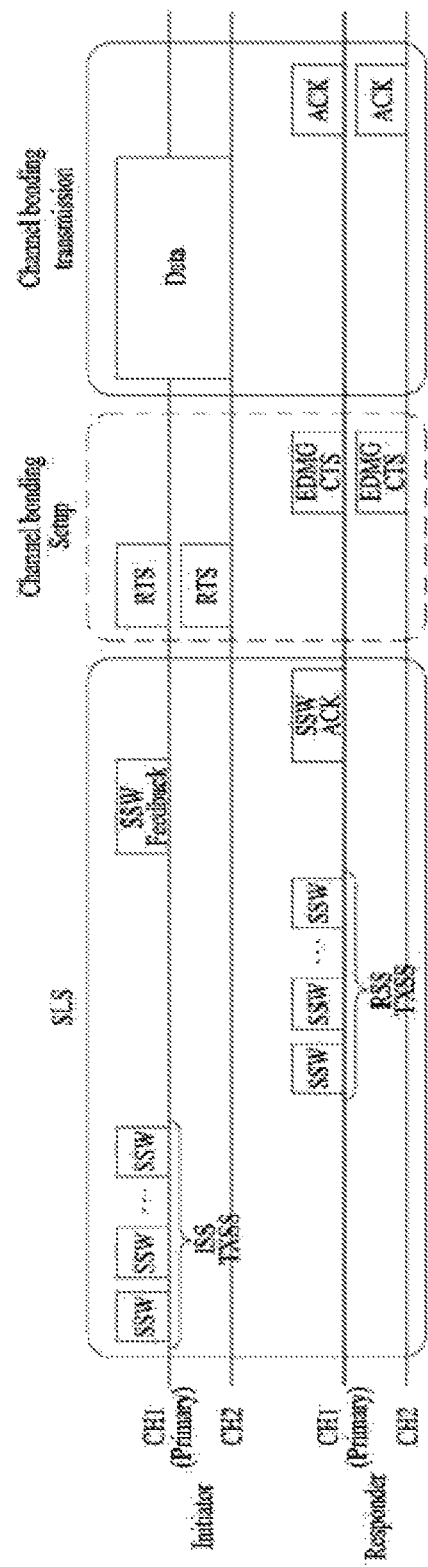
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

3.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
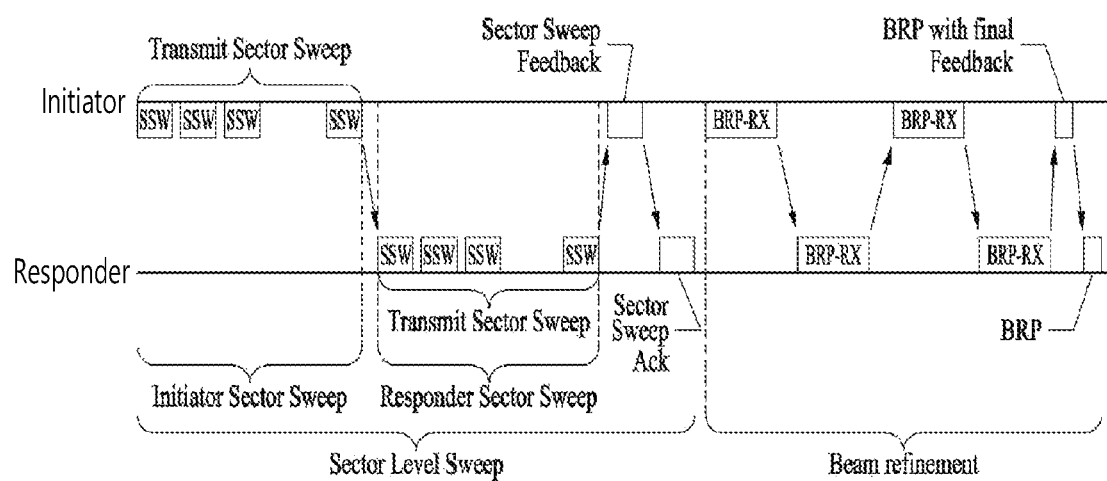
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
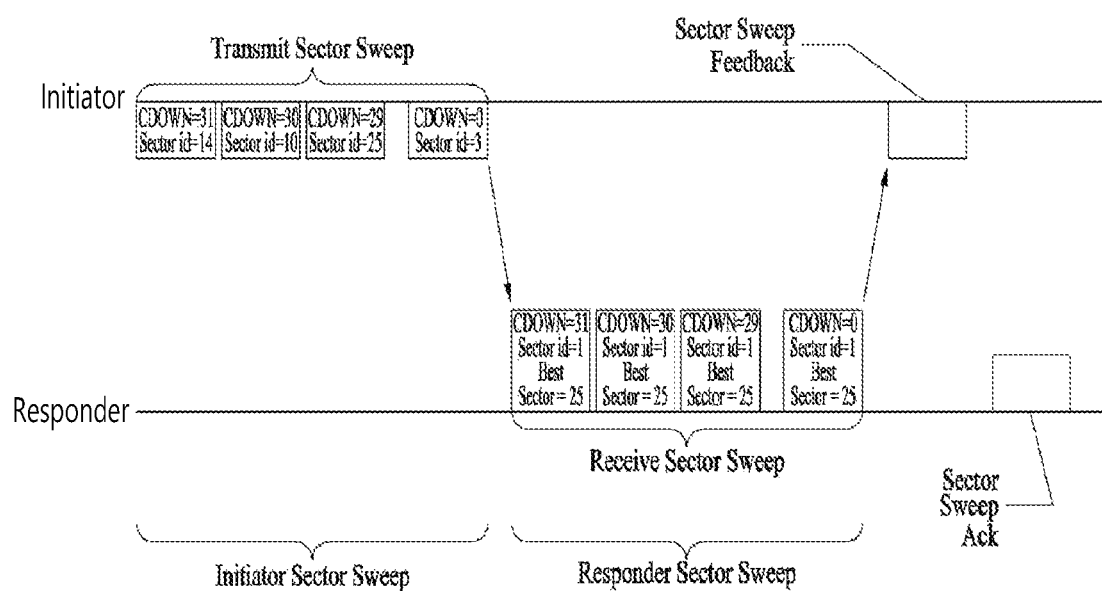
FIG. 13 and FIG. 14 is a diagram showing examples of a Sector Level Sweep (SLS) phase.
Figure 14:
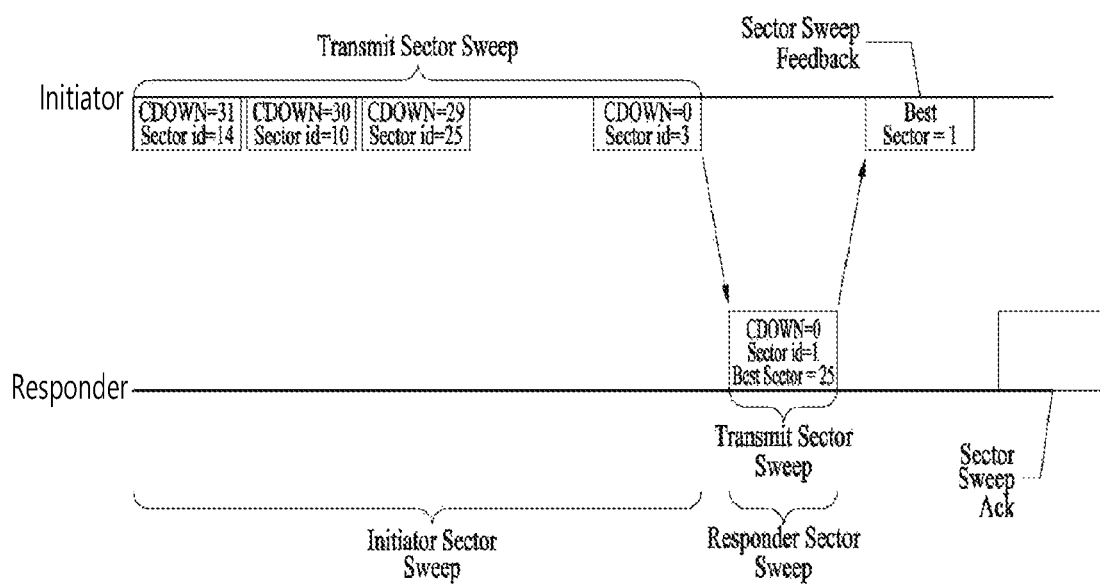

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11 ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

3.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training on one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

3.1.3 Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using/Based on the above-described method, the initiator and the responder may acquire information on the channel that can actually be used for the data transmitted, and the initiator may transmit data through channels that can actually be used.

At this point, since the initiator and the responder have already performed the beamforming training on only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using/based on the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3.2. Performing Beamforming for Multiple Channels

Hereinafter, a beamforming procedure, wherein the above-described beamforming operation is performed on multiple channels (preferably, channels to and from which the initiator and responder are to transmit and/or receive data), will be described in detail.

The above-described beamforming training operation for one channel may not be optimized to the channel bonding process that uses multiple channels for the reasons listed below.

The characteristics of the one channel may not be the same as the characteristics of other channels.

The beamforming training result for the one channel may be different from the beamforming training result for the entire bandwidth.

Accordingly, in this section, as a solution (or method) for maximizing the capability gain in accordance with the channel bonding process, a detailed solution (or method) for performing beamforming training on the entire bandwidth, which is used for the channel bonding process, will hereinafter be described in detail.

Figure 15:
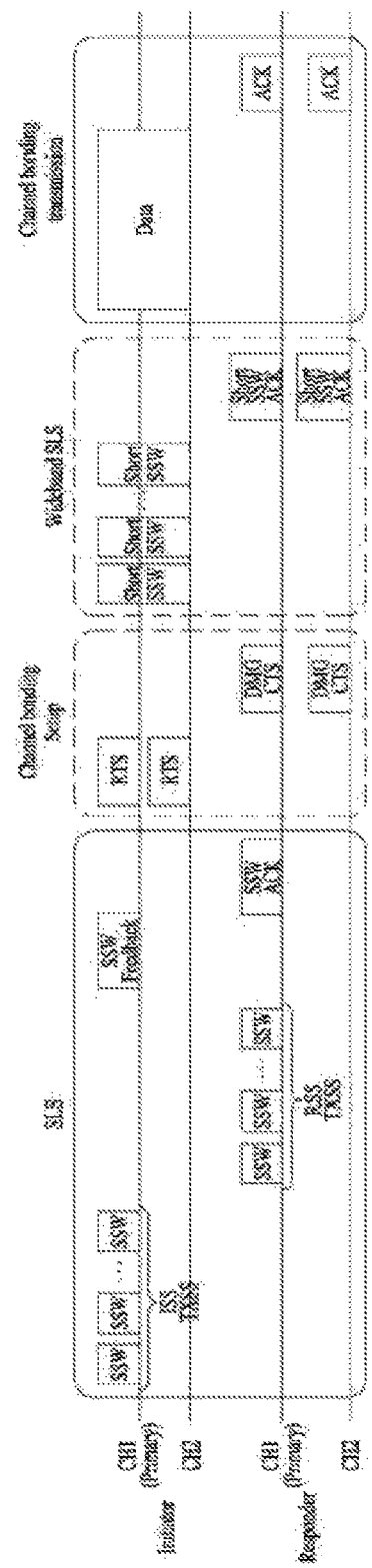
FIG. 15 is a diagram showing operations for performing beamforming on multiple channels according to another exemplary embodiment of the present invention.

FIG. 15 is a diagram showing operations for performing beamforming on multiple channels according to another exemplary embodiment of the present invention. Just as in the case shown in FIG. 11, referring to FIG. 15, an STA that intends to transmit data through the beamforming operation is referred to as an initiator, and an STA that receives the data from the initiator is referred to as a responder. Also, although only a total of 2 channels (e.g., CH1, CH2) are shown in FIG. 15, the configuration of the present invention may also be extendedly applied to channel bonding, channel aggregation, and so on, through 3 or more channels.

As shown in FIG. 15, the operation of performing beamforming for multiple channels according to another exemplary embodiment of the present invention may include a SLS phase, a channel bonding setup phase, a wideband SLS phase, and a channel bonding transmission phase. At this point, the wideband SLS phase will not be limited to the related art SLS configuration, and, therefore, the wideband SLS phase may include all beamforming training methods that can be extended to wideband beamforming training. For example, the wideband SLS phase may be replaced with a wideband BRP phase, which extendedly applies the related art BRP phase, or may include the wideband BRP phase.

Figure 16:
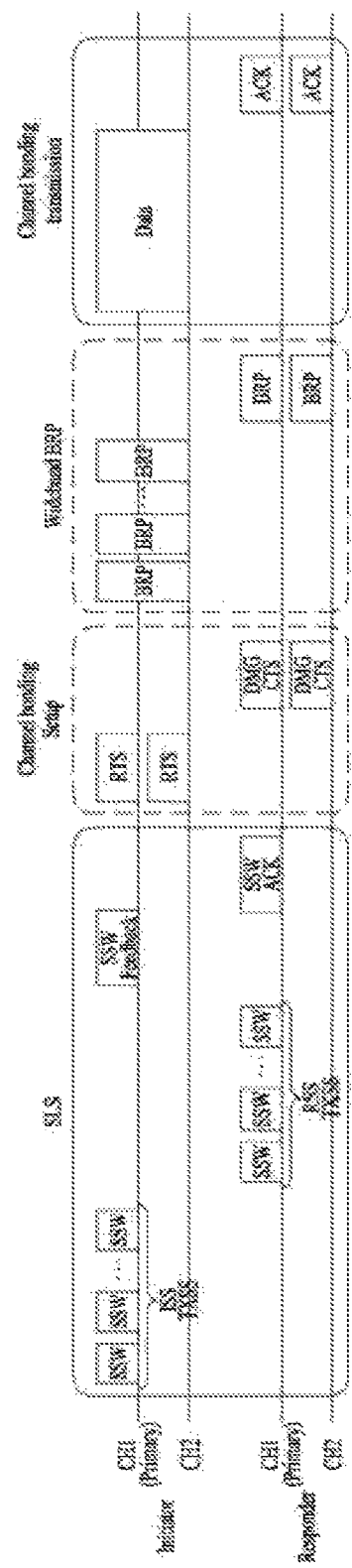
FIG. 16 is a diagram showing operations for performing beamforming on multiple channels according to yet another exemplary embodiment of the present invention.

FIG. 16 is a diagram showing operations for performing beamforming on multiple channels according to yet another exemplary embodiment of the present invention.

As described above, the wideband SLS phase of FIG. 15 may also be replaced with the wideband BRP phase of FIG. 16. Alternatively, according to yet another exemplary embodiment of the present invention, the wideband SLS phase of FIG. 15 may also be configured as a wideband beamforming training phase further including a wideband BRP phase.

3.2.1. SLS Phase

Just as in the above-described operations, which are described above in Section 3.1.1., the initiator and the responder may perform the SLS phase. By performing this phase, the initiator and the responder may perform beamforming training on one channel (e.g., primary channel).

Since the SLS phase has already been described above in detail, a detailed description of the same will be omitted for simplicity.

3.2.2. Channel Bonding Setup Phase

As described above in Section 3.1.2., the initiator and the responder may transmit and/or receive an RTS (setup frame) and a DMG CTS (feedback frame) through the channel bonding setup phase, and, then, the initiator and the responder may transmit and/or receive information for channel bonding, channel aggregation, FDMA transmission, and so on.

Moreover, in addition to the information mentioned above, the initiator and the responder may simultaneously transmit and/or receive information on the method for performing beamforming training on multiple channels to and from one another.

The initiator may notify the responder of the performance or non-performance of the beamforming training on multiple channel through a setup frame or RTS frame. For this, the initiator may transmit the setup frame or RTS frame including the information indicating the performance or non-performance of beamforming training on the multiple channels to the responder.

The responder may notify to the responder whether or not the beamforming training on multiple channels can be performed through a feedback frame or DMG CTS frame. For this, the responder may transmit the feedback frame or DMG CTS frame, which includes the information indicating whether or not the beamforming training on multiple channels can be performed, to the initiator.

Additionally, the responder may notify to the initiator which one of Initiator TX Sector Sweep (I-TXSS), Initiator RX Sector Sweep (I-RXSS), Responder TX Sector Sweep (R-TXSS), and Responder RX Sector Sweep (R-RXSS) is to be performed in the subsequent wideband SLS phase through the feedback frame or DMG CTS frame. Moreover, the responder may notify whether or not to perform beam training on the TX and the RX at the same time through the feedback frame or DMG CTS frame.

Alternatively, the responder may notify whether TX beamforming training is to be performed or whether RX beamforming training is to be performed is to be performed in the wideband BRP phase through the feedback frame or DMG CTS frame. Alternatively, the responder may notify whether or not to perform beam training on the TX and the RX at the same time through the feedback frame or DMG CTS frame.

As shown in the above-described configurations, the beamforming training related information that is transmitted and received by the initiator and the responder to and from one another in the channel bonding setup phase may be included in any one of the setup frame and the feedback frame.

Additionally, in case the initiator intends to transmit data to the responder by using/based on the FDMA method, the initiator may perform the FDMA transmission setup through the channel bonding set up phase.

More specifically, the initiator may signal a resource unit (RU) allocation, a channel feedback request, a report method, and so on, through a setup frame (or RTS frame). Additionally, the responder may notify a Signal to Noise Ratio (SNR) or Signal to Interference & Noise Ratio (SINR) through a feedback frame by using feedback values corresponding to the available channels.

As described above, the initiator and the responder may transmit and/or receive the RTS frame and the DMG CTS frame to and from one another through the channel bonding setup phase. At this point, since the initiator and the responder has performed the beamforming training on one channel (e.g., primary channel) through the above-described SLS phase, the initiator and the responder may also transmit and/or receive the RTS frame and the DMG CTS frame by applying the same best sector direction for the one channel to other channels as well. At this point, the RTS frame and the DMG CTS frame that are transmitted through each of the channels may be duplicated and transmitted for each channel.

3.2.3. Wideband SLS/BRP Phase

Figure 17:
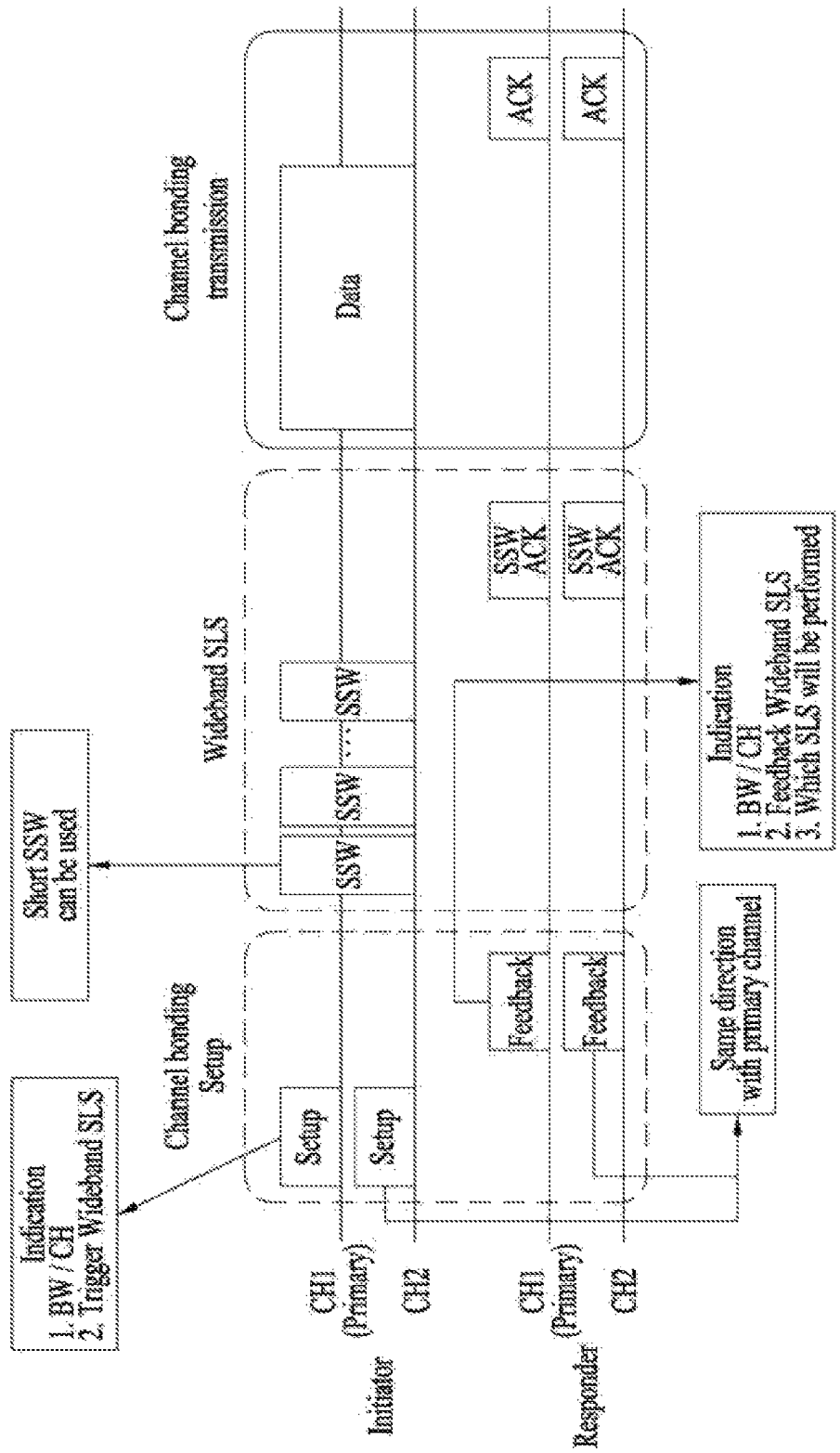
FIG. 17 is a diagram showing in more detail beamforming operations applying a wideband SLS phase according to an exemplary embodiment of the present invention.
Figure 18:
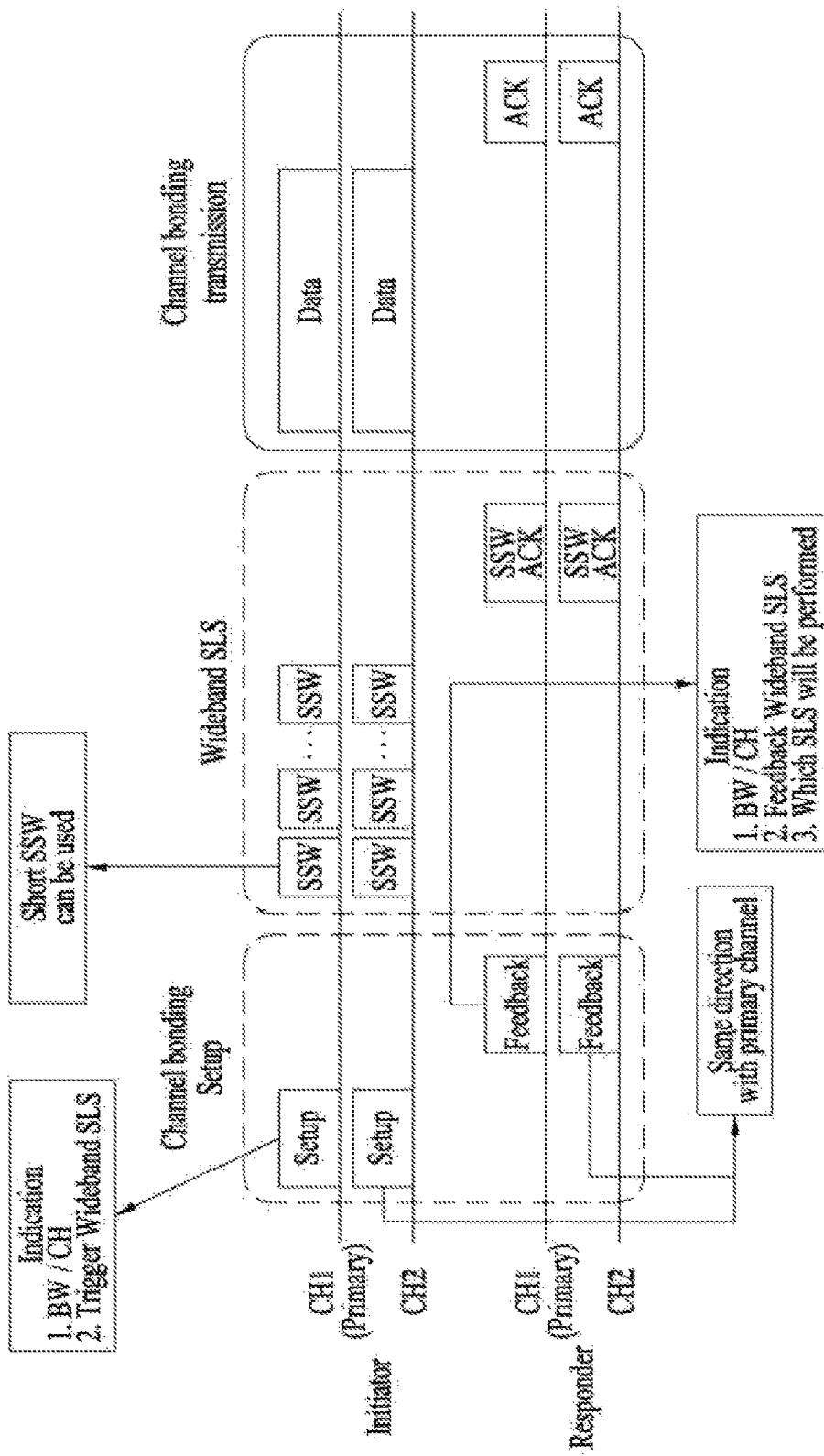
FIG. 18 is a diagram showing in more detail beamforming operations applying a wideband SLS phase according to another exemplary embodiment of the present invention.

FIG. 17 is a diagram showing in more detail beamforming operations applying a wideband SLS phase according to an exemplary embodiment of the present invention, and FIG. 18 is a diagram showing in more detail beamforming operations applying a wideband SLS phase according to another exemplary embodiment of the present invention.

As shown in FIG. 17 and FIG. 18, the initiator and the responder may signal diverse information through the setup frame and the feedback frame, which are transmitted and/or received during the channel bonding setup phase. This has already been described above in detail, and, therefore, a detailed description of the same will be omitted for simplicity.

At this point, the wideband SLS phase according to the examples shown in FIG. 17 and FIG. 18 may be replaced with the wideband BRP phase, as shown in FIG. 16. Herein, during the wideband BRP phase, the initiator and the responder may perform the beamforming training by combining (or aggregating) the BRP frame and the TRN field, which is positioned at the end of the PPDU, instead of the SSW/short-SSW.

Hereinafter, an exemplary embodiment in which the wideband SLS phase is applied, as shown in FIG. 17 and FIG. 18, will be described in detail.

Although FIG. 17 and FIG. 18 only show examples of the initiator transmitting the SSW frame, in the wideband SLS phase, the initiator may transmit both SSW frame and Short-SSW frame (or may select and transmit only one of the two frames). In response to such transmission, the responder may transmit both SSW feedback frame and Short-SSW feedback frame (or may select and transmit only one of the two feedback frames), and the responder may also transmit both SSW ACK feedback frame and Short SSW ACK feedback frame.

FIG. 17 and FIG. 18 only show the TXSS procedure of the initiator. Herein, as shown in FIG. 17 and FIG. 18, after receiving a feedback frame, which corresponds to a response to the transmitted setup frame, the initiator may perform the negotiated beamforming training method with the responder through multiple channels.

Additionally, the beamforming training method that can be applied to the present invention includes I-TXSS, I-RXSS, R-TXSS, R-RXSS, and so on. At this point, during the wideband SLS phase, each of the initiator and the responder may individually perform beamforming training, or the initiator and the responder may combine the beamforming training and perform TX beam training and RX beam training at the same time.

Most particularly, in case the initiator wishes to transmit data by using/based on the channel aggregation method instead of the channel bonding method, the initiator and the responder may also perform the beamforming training in a channel aggregation format.

As reference, the difference in the bandwidth due to the channel bonding and the channel aggregation will hereinafter be described in detail with reference to FIG. 19.

Figure 19:
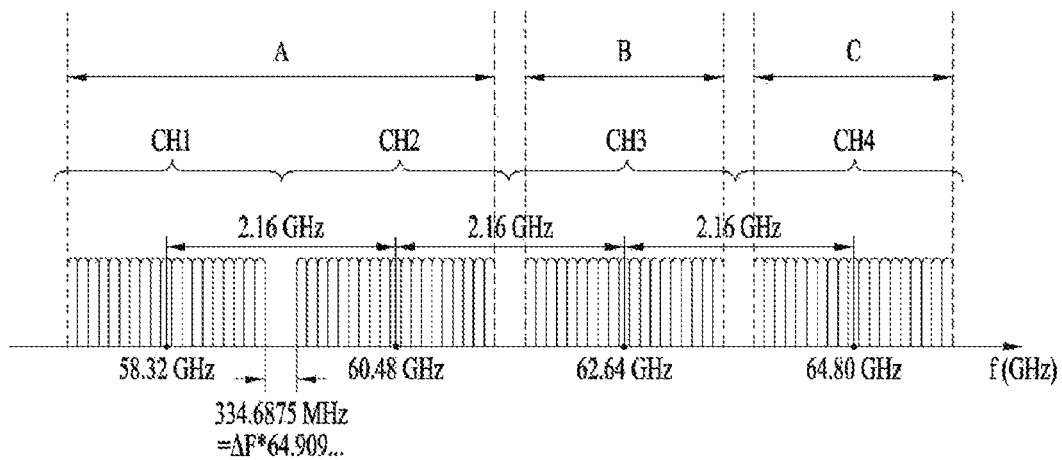
FIG. 19 is a diagram briefly showing a bandwidth corresponding to channel bonding and channel aggregation according to an exemplary embodiment that is applicable to the present invention.

FIG. 19 is a diagram briefly showing a bandwidth corresponding to channel bonding and channel aggregation according to an exemplary embodiment that is applicable to the present invention.

Referring to FIG. 19, A refers to a bandwidth corresponding to a case where channel bonding is performed on CH1 and CH2, and B+C refers to a bandwidth corresponding to a case where channel aggregation is performed on CH3 and CH4.

As described above, in a case where consecutive channels are bonded, a bandwidth including a gap (e.g., 334.6875 MHz) between each channel may be used as the bandwidth for the channel bonding.

Alternatively, in a case where non-consecutive channels are aggregated, a bandwidth that does include the gap between the channels may be used as the bandwidth for the channel aggregation.

Hereinafter, a difference in the wideband SLS phases according to FIG. 17 and FIG. 18 will be described in detail.

As shown in FIG. 17, the initiator may transmit the SSW frame (or Short SSW frame) in a channel bonding format, or the initiator may also duplicate and transmit the SSW frame (or Short SSW frame) for each channel.

In response to such transmission, the responder may transmit a response frame (e.g., SSW ACK or Short SSW ACK) to the initiator as a result of the sector sweep process performed by the initiator. At this point, the response frame may be transmitted in the channel bonding format (or wideband format), or the response frame may be duplicated and transmitted for each channel.

Preferably, if R-TXSS has been performed via wideband (or in the channel bonding format), the responder may transmit the response frame via wideband (or by using/based on the channel bonding method). This is because the beamforming training result value according to the R-TXSS corresponds to the optimal beam direction for the signal transmission, which is based on the wideband (or the channel bonding method).

Also, preferably, if the R-TXSS has not been performed via wideband (or in the channel bonding format), the responder may duplicate and transmit the response frame for each channel. This is because, since the beamforming training according to the R-TXSS has not been performed via wideband (or in the channel bonding format), the transmission beam direction of the responder is used as the optimal beam direction for the signal transmission corresponding to each channel.

However, the R-TXSS may be performed in a case where data or another signal that is to be transmitted to the initiator by the responder exists. In other words, in a case where only the initiator transmits data to the responder by using/based on the channel bonding method, the R-TXSS may be omitted. Accordingly, the responder may duplicate and transmit the response frame (e.g., SSW ACK) for each channel, as shown in FIG. 17 and FIG. 18.

As another example, a wideband BRP phase may be applied instead of the wideband SLS phase of FIG. 17 and FIG. 18 (or in addition to the wideband SLS phase).

During the wideband BRP phase, a BRP phase is transmitted. Alternatively, a new BRP frame, which is configured of information on a wideband channel being additionally included in a BRP frame defined in the related art 11ad system, may be transmitted.

More specifically, the responder transmits a setup frame during the channel bonding setup phase and may then receive a feedback frame, which correspond to a response to the transmitted setup frame. Subsequently, a beamforming training method, which is negotiated by transmitting and/or receiving the setup frame and the feedback frame, is performed with the responder through multiple channels.

At this point, the applicable beamforming training methods may include TX, RX, TX, RX, and so on.

Additionally, as described above, in case the initiator wishes to transmit data by using/based on the channel aggregation method instead of the channel bonding method, the initiator and the responder may perform the beamforming training in the channel aggregation format.

As described above, the initiator may perform beamforming training on multiple channels by transmitting a BRP frame to the responder. As a response to such transmission, the responder may transmit the result of the beamforming training performed by the initiator in a wideband format (or in a channel bonding format), or the responder may duplicate and transmit the corresponding beamforming result for each channel.

Preferably, if the TX beamforming training of the responder has been performed in a wideband format (or in the channel bonding format), the responder may transmit the beamforming training result in a wideband format (or in the channel bonding format). This is because the TX beamforming training result of the responder corresponds to the optimal beam direction for the response frame transmission, which is based on the wideband format (or the channel bonding format).

Alternatively, if the TX beamforming training of the responder has not been performed in a wideband format (or in the channel bonding format), the responder may duplicate and transmit the beamforming training result for each channel. This is because, since the TX beamforming training result of the responder has not been performed in the wideband format (or in the channel bonding format), the transmission beam direction of the responder is used as the optimal beam direction for the signal transmission corresponding to each channel.

3.2.4. Channel Bonding Transmission Phase

Similarly to Section 3.1.3., the initiator and the responder may transmit and/or receive actual data based on the beamforming training result for multiple channels by performing the above-described phases (or process steps). More specifically, the initiator and the responder may transmit/receive channel information on the channels, which are negotiated through the transmission/reception of the RTS frame and DMG CTS frame, and information on the channel bandwidth. And, then, the initiator and the responder perform beamforming training on the multiple channels by using/based on the transmitted/received information. Thereafter, the initiator and the responder transmit/receive data based on the beamforming training result. Herein, since the beamforming training has already been performed for an ideal channel, the data may also be transmitted/received through an ideal channel.

According to this exemplary embodiment, since the initiator and the responder have already performed beamforming training on one channel (e.g., primary channel) as well as beamforming training on multiple channels, the initiator and the responder may achieve an optimal link budget when performing the data transmission method by using/for the multiple channels, such as channel bonding, channel aggregation, FDMA, and so on.

At this point, as a response to the received data, the responder may transmit an ACK frame by using/through the multiple channels through which the data has been received. As a method for performing this process, the responder may transmit an ACK frame by using a channel bonding method through multiple channels, or the responder may duplicate and transmit an ACK frame for each channel. As a preferred example, if the TX beamforming process of the responder has been performed by using/based on the channel bonding method, the responder may transmit the ACK frame in a channel bonding format. This is because the result of the TX beamforming training process of the responder indicates an optimal beam direction for the signal transmission of the channel bonding format.

Figure 20:
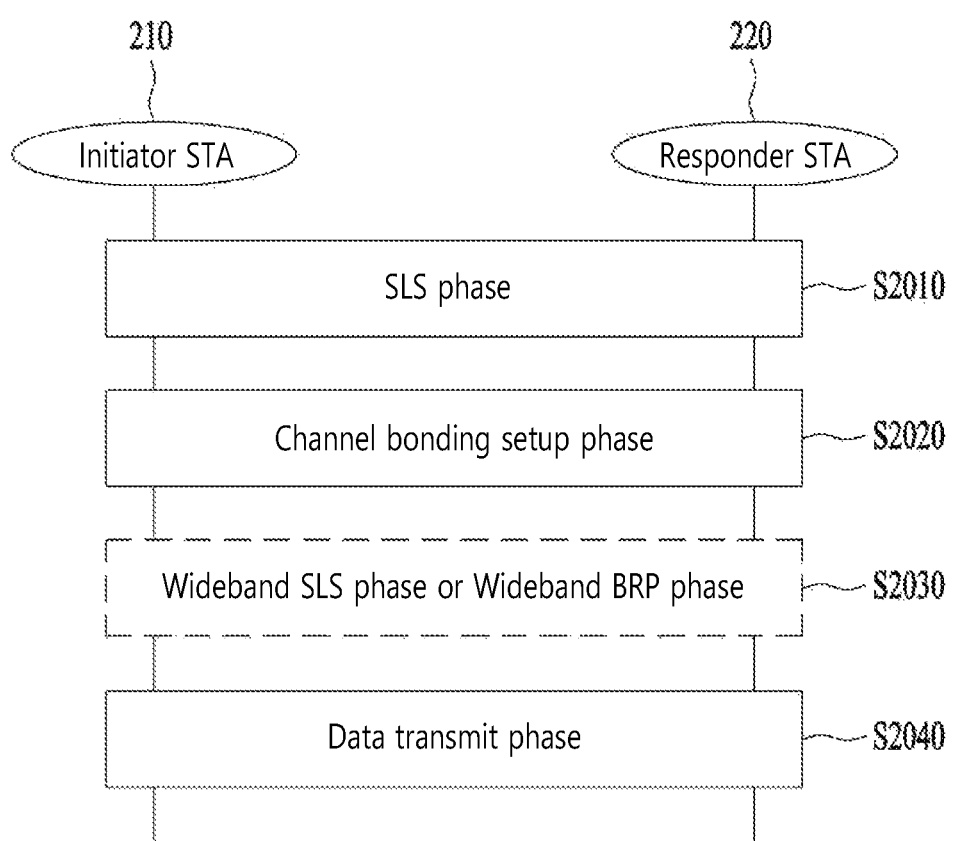
FIG. 20 is a diagram showing a data transmission/reception method of a station that is applicable to the present invention.

FIG. 20 is a diagram showing a data transmission/reception method of a station that is applicable to the present invention. For simplicity in the description, referring to FIG. 20, it will be assumed that an initiator STA (210) refers to an STA that transmits data, and a responder STA (220) refers to an STA that receives data being transmitted from the initiator STA (210). However, according to an actual embodiment, in each of the phases that will hereinafter be described in detail, each STA may be consistently operated interchangeably as the initiator STA (210) and the responder STA (220). In other words, each STA may be operated as the initiator STA (210) and/or the responder STA (220), as required, in each of the phases that will be described below.

Herein, the initiator STA (210) may correspond to a PCP/AP STA, and the responder STA (220) may correspond to a Non-PCP/AP STA. Alternatively, the initiator STA (210) may correspond to a Non-PCP/AP STA, and the responder STA (220) may correspond to a PCP/AP STA. Alternatively, the initiator STA (210) and the responder STA (220) may both correspond to the PCP/AP STA or the Non-PCP/AP STA.

As shown in FIG. 20, the data transmission/reception method of a station that is applicable to the present invention may be configured of 3 phases (or steps) (S2010, S2020, S2040) or 4 phases (or steps) (S2010, S2020, S2030, S2040) according to the exemplary embodiment of the present invention. In the following description of the present invention, the characteristics that will be commonly described may be commonly applied to the data transmission/reception method being configured of 3 phases or 4 phases, and the characteristics that will be described as differences between to two types of methods may be distinctively applied to each configuration.

Firstly, in step S2010, the initiator STA (210) and the responder STA (220) perform beamforming training on one channel (e.g., the primary channel within the system), among the multiple channels that are supported by the wireless LAN system. A detailed signal transmission/reception operation for this process may include SSW frame (or Short SSW frame) transmission/reception and SSW ACK transmission/reception, as shown in FIG. 11 to FIG. 16.

Most particularly, in step S2010, the initiator STA (210) may transmit one or more SSW frames (or Short SSW frames) to the responder STA (220) through the one channel and may, then, receive an SSW ACK from the responder STA (220) through the one channel Thereafter, the initiator STA (210) may determine a best sector information corresponding to the one channel based on the received SSW ACK.

In response to this, in step S2010, the responder STA (220) may also know the best sector information of the initiator STA (210) corresponding to the one channel.

Additionally, in step S2010, the responder STA (220) may also know the (RX) best sector information of the responder STA (220) corresponding to the one channel. In this case, the responder STA (220) may receive a signal, which is transmitted from the initiator STA (210) in step S2020 and step S2040, by using/based on the (RX) best sector information of the responder STA (220) corresponding to the one channel (in case the data transmission/reception method of the station according to the present invention is configured of 3 phases (or steps)), or the responder STA (220) may receive a signal, which is transmitted from the initiator STA (210) in step S2020 by using/based on the (RX) best sector information of the responder STA (220) corresponding to the one channel (in case the data transmission/reception method of the station according to the present invention is configured of 4 phases (or steps)).

In step S2020, by transmitting and/or receiving a signal to and from the responder STA (220) by using/based on the based sector information corresponding to the one channel, which is determined in step S2010, the initiator STA (210) determines one or more channels through which data is to be transmitted and a data transmission method for the one or more channels in step S2040. In response to this, by transmitting and/or receiving a signal to and from the initiator STA (210), the responder STA (220) may determine one or more channels through which data is to be received and a data reception method using/for the one or more channels. At this point, in case the RX best sector information of the responder STA (220) is determined in step S2010, the responder STA (220) may transmit and/or receive a signal to and from the initiator STA (210).

A detailed signal transmission/reception operation for this may include setup frame (e.g., RTS frame) transmission/reception and feedback frame (e.g., DMG CTS frame) transmission/reception, as shown in FIG. 11, FIG. 15 to FIG. 18.

More specifically, the initiator STA (210) transmits a setup frame for each channel to the responder STA (220) by applying the best sector information for the one channel, which is determined in step S2010, to all or part of the multiple channels including the one channel. And, then, the initiator STA (210) receives a feedback frame respective to each setup frame for each channel through each channel from the responder STA (220). Accordingly, the best sector information, which is determined in step S2010, may be applied and transmitted to the setup frame, which is transmitted through the plurality of channels, as shown in FIG. 11, FIG. 15 to FIG. 18.

At this point, the setup frame may include channel information and channel bandwidth information that are required by the initiator STA (210) for performing data transmission. As a response to this, the feedback frame may include information on the channel (channel information) that is actually available to the responder STA (220) for performing data reception and channel bandwidth information in response to the setup frame.

Accordingly, the initiator STA (210) may determine a data transmission method using one or more channels that are intended to transmit the data and a data transmission method using/for the one or more channels based on the received feedback information.

Herein, a channel bonding method, a channel aggregation method, and an FDMA method may be applied to the data transmission method that can be applied to the present invention. At this point, the channel bonding method may refer to a method for transmitting the data by bonding multiple consecutive channels, and the channel aggregation method may refer to a method for transmitting the data by aggregating multiple consecutive or non-consecutive channels.

Additionally, among the data transmission/reception methods of the station that can be applied to the present invention, according to the data transmission/reception method that is configured of 4 phases (or steps) (S2010, S2020, S2030, S2040), in step S2020, the initiator STA (210) may notify the responder STA (220) whether or not to perform beamforming training on multiple channels through the setup frame. In response to this, the responder STA (220) may notify the initiator STA (210) whether or not the beamforming training on the multiple channels is possible through the feedback frame.

Also, the responder STA (220) may notify the initiator STA (210) which type of beamforming training method (e.g., I-TXSS, I-TXSS, R-TXSS, R-RXSS, TX beamforming, RX beamforming, TX and RX beamforming) is to be performed in step S2030.

Among the data transmission/reception methods of the station that can be applied to the present invention, according to the data transmission/reception method that is configured of 3 phases (or steps) (S2010, S2020, S2040), in step S2040, the initiator STA (210) may transmit the data to the responder STA (220) through one or more channels, which are determined in step S2020, by applying the determined data transmission method for the one or more channels. More specifically, after applying the best sector information, which is determined in step S2010, to each of the determined one or more channels, the initiator STA (210) may transmit the data to the responder STA (220) by using/based on the determined data transmission method.

Alternatively, among the data transmission/reception methods of the station that can be applied to the present invention, according to the data transmission/reception method that is configured of 4 phases (or steps) (S2010, S2020, S2030, S2040), the data transmission/reception methods of the station that can be applied to the present invention may further include step S2030.

In step S2030, the initiator STA (210) may perform beamforming training on one or more channels, which are determined as the channel(s) for transmitting the data in step S2020.

According to a detailed signal transmission/reception operation for this process, the initiator STA (210) may transmit one or more SSW frames (or Short SSW frames) or BRP frames to the responder STA (220) and may then receive a response frame corresponding to the transmitted frame(s) from the responder STA (220).

At this point, the initiator STA (210) may determine the best sector information for the one or more channels, which are determined as one or more channels for transmitting data in step S2020, based on the received response frame.

Accordingly, in step S2040, the initiator STA (210) may transmit data to the responder STA (220) by applying the best sector information for the one or more channels, which are determined in step S2030 as one or more channels for transmitting data in step S2020, and the data transmission method, which is determined in step S2020. In response to this, the responder STA (220) may receive the data, which is transmitted by the initiator STA (210) as described above.

Additionally, the beamforming training method that can be applied to the present invention may also include only part of the phases (or steps) among the plurality of phases (or steps) that are described above.

Alternatively, the beamforming training method that can be applied to the present invention may only include the SLS phase for the multiple channels or the BRP phase for the multiple channels.

For example, according to the beamforming training method that can be applied to the present invention, the STA that intends to transmit a signal through multiple channels may perform beamforming training through the BRP phase for the multiple channels. And, then, the corresponding STA may transmit a signal by applying the best sector information according to the beamforming training process for the multiple channels.

4. Proposed Exemplary Embodiment

Therefore, hereinafter, diverse PPDU formats propose a PPDU format that can be applied to any one or more of the diverse beamforming training methods, which are described above. Most particularly, the present invention proposes a PPDU format that can be transmitted/received between the STAs for the beamforming training on multiple channels.

Hereinafter, a PPDU format for the beamforming training that can be applied to the present invention will be described in detail based on the PPDU format, which is described above in FIG. 10.

At this point, the payload part (or portion) of the PPDU format that will be described below may include a SSW frame or BRP frame, which is defined in the related art legacy (e.g., had) system in order to support the legacy (e.g., had) system, or the payload part (or portion) of the PPDU format may include a Short SSW frame and an extended BRP frame, which correspond to a new frame for the 11ay system, which can apply the present invention.

Additionally, although a case where a total of 2 to 3 channels are used is described in the following description, according to the exemplary embodiment that can be applied to the present invention, the total number of channels may be extendedly applied to be equal to 6 or 8.

Hereinafter, each of the PPDU formats that can be applied to the beamforming training method for signal (e.g., data) transmission of the channel bonding, channel aggregation, and FDMA method by using multiple channels will be described in detail.

4.1. PPDU Format for Beamforming Training Applying the Channel Bonding Method

4.1.1. First Example

FIG. 21 is a diagram showing a PPDU format for beamforming training applying a channel bonding method according to a first exemplary embodiment of the present invention.

As shown in FIG. 21, the PPDU format for the beamforming training process applying the channel bonding method for multiple channels (e.g., CH1 and CH2) between the initiator and the responder may include an L-STF, an L-CE, an L-Header, and a Short-SSW (or SSW).

Herein, as described above, the L-STF, L-CE, and L-Header correspond to a preamble part, which is defined in the legacy (e.g., 11ad) system.

According to the first example, in a case where the initiator and the responder transmit a signal (e.g., data) after performing channel bonding, the initiator and the responder may duplicate and transmit the legacy format for the channels that are intended to be used in order to perform the signal transmission.

At this point, the actual beamforming training may be performed through the L-STF and L-CE of each channel.

Since the legacy format is duplicated and transmitted for each channel, there may exist a disadvantage in that the characteristic of a frequency channel having a gap (or space) existing between each channel cannot be reflected (or considered) in the beamforming training. However, according to the PPDU format of this example, there exists an advantage in that the time consumed for the actual beamforming training process may be minimized.

4.1.2. Second Example

FIG. 22 is a diagram showing a PPDU format for beamforming training applying a channel bonding method according to a second exemplary embodiment of the present invention.

As shown in FIG. 22, the PPDU format for the beamforming training process applying the channel bonding method for multiple channels (e.g., CH1 and CH2) between the initiator and the responder may include an L-STF, an L-CE, an L-Header, and a Short-SSW (or SSW). And, the PPDU format may further include channel bonded EDMG STF and EDMG CE for multiple channels.

Herein, as described above, the L-STF, L-CE, and L-Header correspond to a preamble part, which is defined in the legacy (e.g., had) system.

Additionally, the EDMG STF and EDMG CE may be configured of a sequence for Automatic Gain Control (AGC), channel estimation, and antenna weight vector (AWV) corresponding to the wideband.

Additionally, in the PPDU format being transmitted by the initiator and the responder, the L-STF, L-CE, L-Header, and Short SSW (or SSW) may be duplicated and transmitted for each channel. Conversely, the EDMG STF and EDMG CE may be transmitted via wideband (or after being channel bonded) as much as the bandwidth that is used for the channel bonding process.

According to the second example, the initiator and the responder may transmit the EDMG STF and EDMG CE in the wideband format in order to reflect all of the wideband channel characteristics of the channels, which are to be used for the channel bonding transmission process, to the beamforming training process.

Therefore, the beamforming training on the frequency band that is being used for the channel bonding process according to the second example may be performed through the EDMG STF and EDMG CE. The above-described configuration is advantageous in that more accurate channel characteristics may be reflected when performing the beamforming training process.

4.1.3. Third Example

FIG. 23 is a diagram showing a PPDU format for beamforming training applying a channel bonding method according to a third exemplary embodiment of the present invention.

As shown in FIG. 23, the PPDU format for the beamforming training process applying the channel bonding method for multiple channels (e.g., CH1 and CH2) between the initiator and the responder may include an L-STF, an L-CE, an L-Header, and an EDMG Header A. And, the PPDU format may further include channel bonded EDMG STF, EDMG CE, and Short-SSW (or SSW) for multiple channels.

Herein, as described above, the L-STF, L-CE, and L-Header correspond to a preamble part, which is defined in the legacy (e.g., 11ad) system.

The EDMG Header A corresponds to a portion (or part) including information for the 11ay STA. More specifically, the EDMG Header A may include channel information, bandwidth information, RU allocation information, and so on, of the PPDU format that is being transmitted.

Additionally, as described above, the EDMG STF and EDMG CE may be configured of a sequence for Automatic Gain Control (AGC), channel estimation, and antenna weight vector (AWV) corresponding to the wideband.

Additionally, in the PPDU format being transmitted by the initiator or the responder, the L-STF, L-CE, L-Header, and EDMG Header A may be duplicated and transmitted for each channel. Conversely, the EDMG STF, EDMG CE, and Short SSW (or SSW) may be transmitted via wideband (or after being channel bonded) as much as the bandwidth that is used for the channel bonding process.

According to the third example, the initiator and the responder may transmit control information, such as SSW or Short SSW, by using/based on the same format (or bandwidth) as the case when performing the channel bonding transmission. Additionally, the initiator and the responder may transmit the EDMG STF and EDMG CE in the wideband format in order to reflect all of the wideband channel characteristics of the channels, which are to be used for the channel bonding transmission process, to the beamforming training process.

In addition to the channel bonding method, the above-described PPDU format according to the third example may also be extendedly applied as a PPDU format for a beamforming training process applying the channel aggregation method or the FDMA transmission method.

The diverse PPDU formats that are described above may be used for the beamforming training on one direction (or a one-way beamforming training process). In other words, the initiator and the responder may perform the beamforming training process for one direction by using/based on the above-described diverse PPDU formats.

As an additional exemplary embodiment, a TRN field may be further included at an end part (or portion) within a time domain of the PPDU format. For this method, signaling through the L-Header may be required. In this case, the initiator and the responder may perform beamforming training on both directions (or a two-way beamforming training process) by using/based on the PPDU format.

FIG. 24 is a diagram showing a PPDU format including a TRN field according to an exemplary embodiment of the present invention.

As shown in FIG. 24, the PPDU format additionally including a TRN field in the above-described PPDU formats shown in FIG. 21 or FIG. 23 may be applied as the PPDU format according to the above-described example.

Although FIG. 24 shows an example of a TRN field being included in part of the above-described PPDU format, as the PPDU format that can be applied to the present invention, the TRN field may be included in all of the above-described PPDU formats. At this point, although FIG. 24 only shows a PPDU format that is being transmitted via wideband for channels, wherein the TRN field is used for the channel bonding process, the TRN field may also be transmitted in a duplicated format having a gap existing between each channel.

Additionally, the above-described TRN field may be replaced with the EDMG STF and the EDMG CE. For example, the above-described replacement configuration may be verified by referring to an exemplary comparison between the PPDU format shown in (b) f FIG. 24 and the PPDU format shown in FIG. 22. Such replacement configuration may be applied to all of the above-described PPDU formats.

Herein, the TRN field may include a TRN-T for TX beamforming and a TRN-R for RX beamforming. Accordingly, by including the TRN-T in the TRN field that is included in the PPDU format, the initiator and the responder may perform TX beamforming more accurately, or by including the TRN-R in the TRN field that is included in the PPDU format, the initiator and the responder may perform RX beamforming more accurately. Additionally, by including both the TRN-T and the TRN-R in the TRN field that is included in the PPDU, the initiator and the responder may perform both TX and RX beamforming more accurately.

Additionally, the above-described examples disclose PPDU formats including the SSW or Short SSW for performing the beamforming training process for multiple channels. In another example, a PPDU format including a BRP frame instead of the SSW or Short SSW within the above-described PPDU format may be used. A detailed example according to the present invention will hereinafter be described.

FIG. 25 to FIG. 29 are diagrams respectively showing a PPDU format including a TRN field according to another exemplary embodiment of the present invention.

As shown in FIG. 25 to FIG. 29, the SSW or Short SSW within the above-described PPDU format may be replaced with the BRP. Accordingly, as shown in the PPDU format of FIG. 25, the SSW or Short SSW included in the PPDU format shown in (a) of FIG. 29 may be replaced with the BRP. Alternatively, as shown in the PPDU format of FIG. 26, the SSW or Short SSW included in the PPDU format shown in (b) of FIG. 29 may be replaced with the BRP. Alternatively, as shown in FIG. 27, the TRN field of the PPDU format that can be applied to the present invention may be duplicated and transmitted for each channel instead of being transmitted by using a wideband transmission method (or channel bonding method).

Additionally, as shown in FIG. 28 and FIG. 29, each PPDU format may additionally include an EDMG Header A for the PPDU format shown in FIG. 27 and FIG. 26.

More specifically, as shown in FIG. 28 and FIG. 29, the initiator and the responder transmit a PPDU format to and from one another, wherein the PPDU format includes L-STF, L-CE, L-Header, and EDMG Header A fields, which are duplicated and transmitted for each channel, and includes a BRP field, which is also transmitted for each channel Herein, the TRN field may be transmitted by using a different method according to the transmission method between the initiator and the responder.

For example, as described below in Section 4.2., in order to perform beamforming by using/based on the channel aggregation method, wherein two channels are aggregated, the initiator and the responder may use a PPDU format including a TRN field, which is transmitted for each of the channels being channel aggregated as shown in FIG. 28. At this point, the TRN field may be duplicated and transmitted for each channel.

As another example, in order to perform beamforming by using/based on the channel bonding method, wherein two channels are bonded, the initiator and the responder may use a PPDU format including a TRN field, which is transmitted for the two bonded channels via wideband as shown in FIG. 29.

Herein, the EDMG Header A may include information for the 11ay STA. For example, the EDMG Header A may include channel information, bandwidth information, and so on, of the transmitted PPDU format. Additionally, the EDMG Header A may also indicate separate information that is intended only for the 11ay system.

4.2. PPDU Format for Beamforming Training Applying the Channel Aggregation Method Unlike the above-described channel bonding transmission method, which corresponds to a method of bonding consecutive channels, in order to perform beamforming training on a channel aggregation transmission process, wherein consecutive or non-consecutive channels are aggregated and transmitted, the following PPDU format may be used.

4.2.1. First Example

FIG. 30 is a diagram showing a PPDU format for beamforming training applying a channel aggregation method according to a first exemplary embodiment of the present invention.

As shown in FIG. 30, according to the first example, the initiator and the responder may duplicate and transmit the same information for the channels that are used in the channel aggregation process.

At this point, the beamforming training may be performed through the L-STF and L-CE parts (or portions) of each channel.

Herein, the EDMG Header A may include information for the 11ay STA. For example, the EDMG Header A may include channel information, bandwidth information, and so on, of the transmitted PPDU format. Additionally, the EDMG Header A may also indicate separate information that is intended only for the 11ay system.

4.2.2. Second Example

FIG. 31 is a diagram showing a PPDU format for beamforming training applying a channel aggregation method according to a second exemplary embodiment of the present invention.

As shown in FIG. 31, according to the second example, the initiator and the responder may duplicate and transmit the same information for the channels that are used in the channel aggregation process. At this point, the beamforming training may be performed through the L-STF and L-CE parts (or portions) of each channel.

For reference, the PPDU format according to the example presented above may actually have the same configuration as the above-described PPDU format shown in FIG. 21.

Additionally, as described above, a PPDU format, which is configured by additionally including a TRN field in the above-described PPDU format, may be used as the PPDU format for performing beamforming training applying the channel aggregation method that can be applied to the present invention. Additionally, the above-described examples disclose PPDU formats including the SSW or short SSW in order to perform beamforming training on multiple channels. Herein, in the other example, a PPDU format including a BRP frame instead of the SSW or short SSW may be used.

At this point, the PPDU format for performing a beamforming training process applying the channel aggregation method may include a TRN field, which is duplicated and transmitted for each channel, just as the PPDU formats shown in (c) of FIG. 24, FIG. 27, and FIG. 28.

In other words, the PPDU format that is transmitted and/or received by the initiator and the responder in order to perform a beamforming training process applying the channel bonding method may include the PPDU format that is transmitted and/or received by the initiator and the responder in order to perform a beamforming training process applying the channel aggregation method.

4.3. PPDU Format for Beamforming Training Applying the FDMA Transmission Method In the exemplary embodiment that can be applied to the present invention, in order to perform FDMA transmission, the initiator and the responder may transmit the following types of PPDU formats during the above-described beamforming training procedure.

Figure 32:
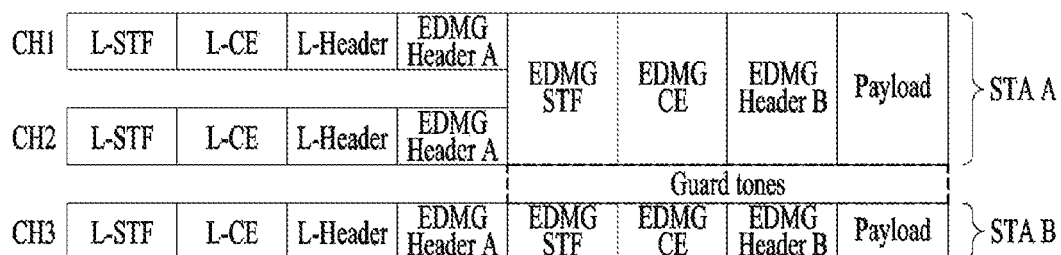
FIG. 32 is a diagram showing a PPDU format for beamforming training applying a FDMA method according to an exemplary embodiment of the present invention.

FIG. 32 is a diagram showing a PPDU format for beamforming training applying a FDMA method according to an exemplary embodiment of the present invention. More specifically, FIG. 32 shows an example of a FDMA transmission method, wherein CH1 and CH2 are allocated to STA A, and wherein CH3 is allocated to STA B.

The payload part (or portion) of FIG. 32 may include a SSW or Short SSW. Additionally, according to the exemplary embodiment of the present invention, the EDMG Header B may be omitted.

As described above, the PPDU format shown in FIG. 32 may be used for channels corresponding to a RU size (e.g., channel bonding bandwidth) being allocated to each STA in order to perform a beamforming training process for STAs being allocated with a specific channel or multiple channels according to the exemplary embodiment that can be applied to the present invention.

More specifically, the STA A, which is allocated with resources through a channel bonding format between CH1 and CH2, may receive EDMG STF, EDMG CE, and payload (SSW or Short SSW) in the channel bonding format between CH1 and CH2 in order to perform beamforming training. In other words, an STA (e.g., PCP/AP STA) that wishes to transmit a signal to the STA A may transmit a PPDU format, which includes the EDMG STF, EDMG CE, and payload in the channel bonding format between CH1 and CH2, among the PPDU formats shown in FIG. 32, to the STA A.

Additionally, referring to FIG. 32, STA B, which is allocated with resources of CH3, may receive a PPDU format of a single channel transmission format for CH3 in order to perform the beamforming training process. At this point, a guard tone may be used in order to prevent interference from occurring between CH2 and CH3.

The above-described PPDU format may be extendedly applied to a wider range (or larger number) of channels. Additionally, the above-described PPDU format may also be extendedly applied to diverse cases of RU allocation.

Additionally, as described above, the PPDU format that can be applied to the present invention may also include a TRN field so as to support a two-way beamforming training process. Additionally, the examples that are presented above correspond to a PPDU format including the SSW or Short SSW in order to perform beamforming for multiple channels. In another example, a PPDU format including the BRP frame instead of the SSW or Short SSW w=in the above-described PPDU format may be used.

FIG. 33 and FIG. 34 are diagrams respectively showing a PPDU format for beamforming training applying a FDMA method according to another exemplary embodiment of the present invention. More specifically, as shown in the case of FIG. 32, FIG. 33 and FIG. 34 illustrate an FDMA transmission method, wherein CH1 and CH2 are allocated to STA A, and wherein CH3 is allocated to STA B.

At this point, although FIG. 33 and FIG. 34 show configurations, wherein CH1 and CH2 are used for the beamforming training that is performed with STA A, and wherein CH3 is used for the beamforming training that is performed with STA B, the bandwidth that can be allocated to each STA may be extended to a maximum of 4 channels.

More specifically, as shown in FIG. 33 and FIG. 34, the PPDU format for performing the beamforming training with STA A and STA B may include L-STF, L-CE, L-Header, BRP, and TRN. Alternatively, the PPDU format may further include EDMG Header-A.

At this point, the TRN may be transmitted throughout all of the channels being allocated to each STA (e.g., STA A, STA B), and the other fields may be duplicated and transmitted for each channel being allocated to each STA.

4.3. Wideband TRN Field

As described above, in the 11ay system that can be applied by the present invention, the 11ay system may transmit and/or receive data by using multiple channels, and, for this, the system may perform beamforming training processes between the STAs, which transmit and/or receive signals to and from one another for diverse types of PPDU formats. For this, in case a signal (e.g., data, frame) is transmitted by using one of the channel bonding, channel aggregation, and FDMA methods, the system may use a PPDU format including a TRN field corresponding to a bandwidth that is occupied by a payload or a TRN field corresponding to a bandwidth that is occupied by EDMG STF and EDMG CE that needs to be decoded by a receiver in order to perform beamforming tracking (e.g., beam refinement or beam tracking, and so on). At this point, the TRN field may include all of an AGC subfield and a TRN-R/T subfield. By doing so, the STAs transmitting and/or receiving signals may be capable of performing optimal beam refinement or beam tracking for the channel included in the bandwidth, which is used by the STAs for transmitting and/or receiving signals.

Accordingly, when a frame is transmitted by using multiple channels at the same time, this section proposes which type of sequences are transmitted from the TRN field within the PPDU format in order to perform beamforming training through multiple channels.

Hereinafter, for simplicity in the description, an exemplary case where a TRN unit value is set to 1 will be described in detail. In other words, an exemplary case where the n value is equal to 1 will be described in detail. Additionally, if the value n becomes greater than 1, a case where n=1 may simply be extendedly applied.

4.3.1. In Case of Using 1 Channel Bandwidth

Figure 35:
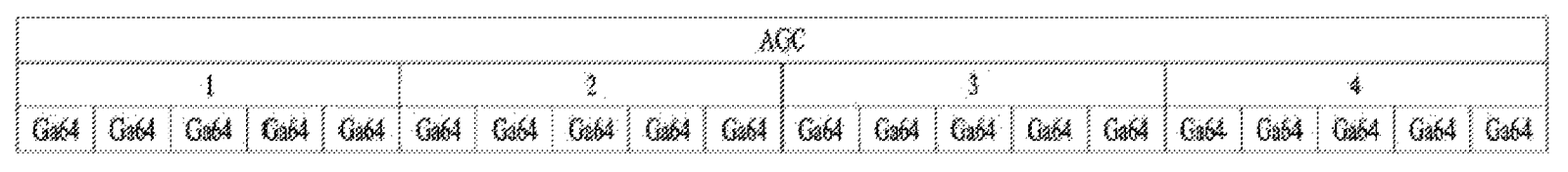
Figure 36:
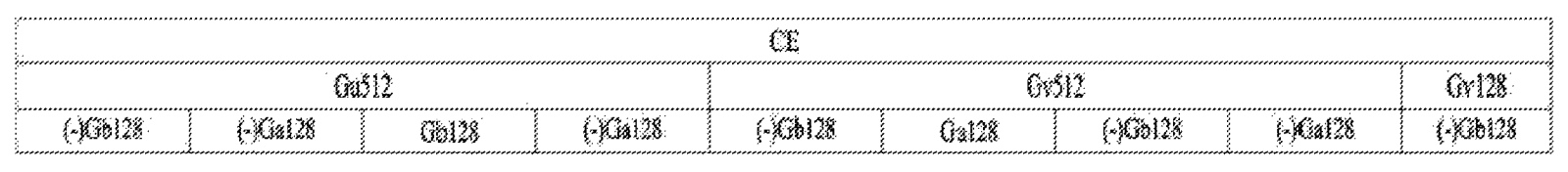
Figure 37:
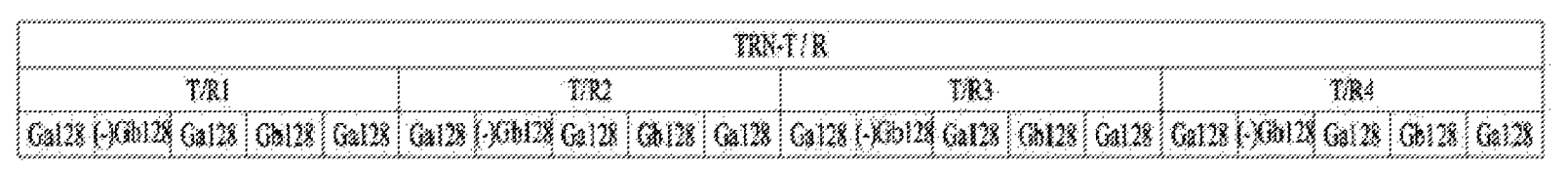

FIG. 35 to FIG. 37 are diagrams showing sequences being transmitted from each of an AGC subfield, a CE subfield, and a TRN-T/R subfield, in case the TRN field corresponds to one channel bandwidth.

4.3.2. In Case of Using 2 Channel Bandwidths

Figure 38:
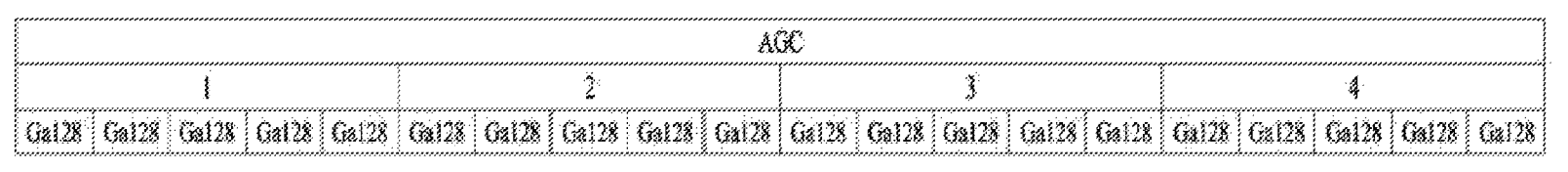
Figure 39:
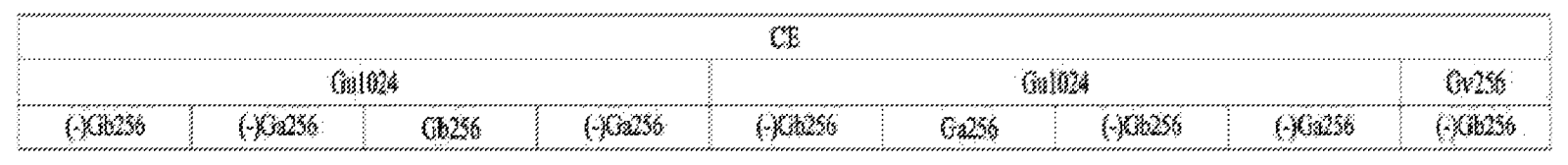
Figure 40:
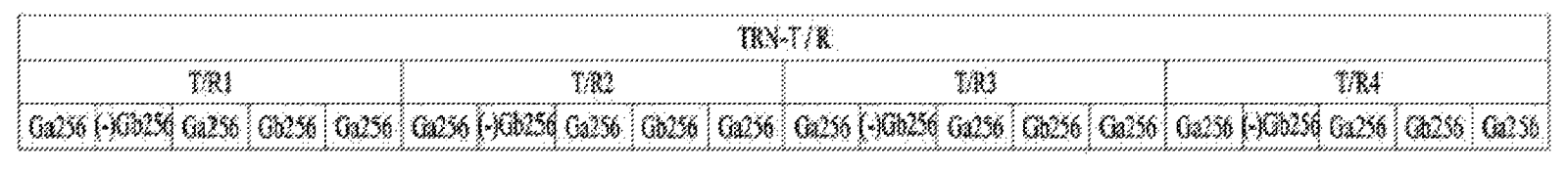

FIG. 38 to FIG. 40 are diagrams showing sequences being transmitted from each of an AGC subfield, a CE subfield, and a TRN-T/R subfield, in case the TRN field corresponds to two channel bandwidths.

4.3.3. In Case of Using 4 Channel Bandwidths

Figure 41:
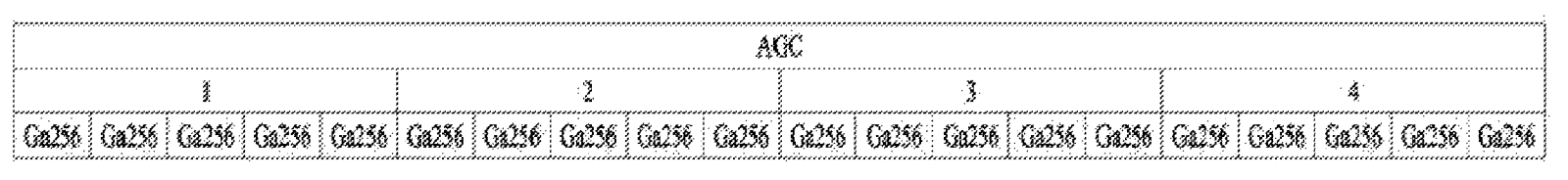
Figure 42:
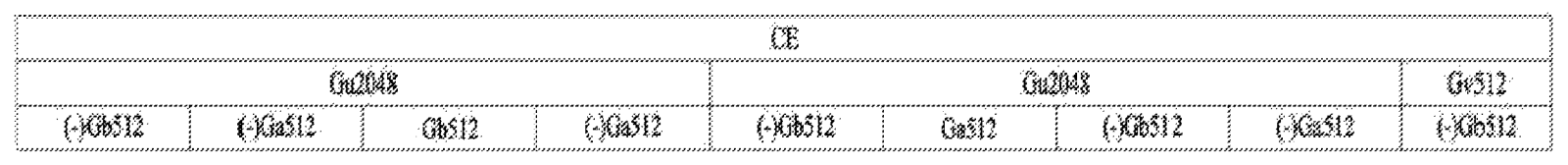
Figure 43:
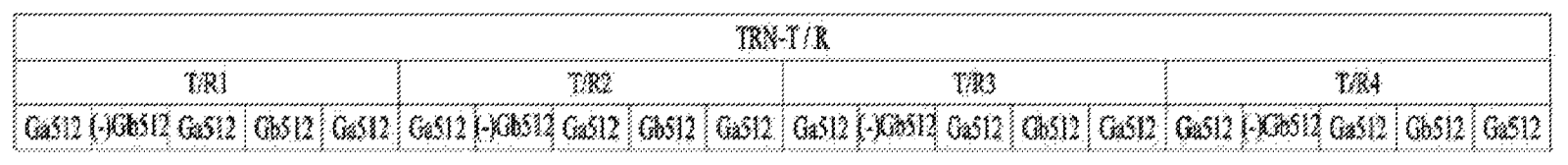

FIG. 41 to FIG. 43 are diagrams showing sequences being transmitted from each of an AGC subfield, a CE subfield, and a TRN-T/R subfield, in case the TRN field corresponds to four channel bandwidths.

As described above, when a TRN field is included in a PPDU format, which is transmitted and/or received in order to perform beamforming training according to the present invention, and if a bandwidth corresponding to the TRN field is increased to two times the size of 1 channel bandwidth, the TRN field increases a sampling rate to 2 times its initial rate. Similarly, if the bandwidth is increased to 3 times, the sampling rate is increased to 3 times its initial rate, and, if the bandwidth is increased to 4 times, the sampling rate is increased to 4 times its initial rate. Accordingly, even if the size of the channel bandwidth corresponding to each TRN field varies (or changes), the same amount of time may be consumed for encoding and decoding each TRN field.

Additionally, although Section 4.3.1. to Section 4.3.3. respectively describe cases where each field (1, 2, 3, 4) included in the AGC subfield includes 5 Golay sequences (Ga), the number of Golay sequences being included in each of the fields may be set to a higher number or a lower number.

Moreover, in Section 4.3.1. to Section 4.3.3., the TRN field corresponding to each case may not include a CE subfield. In other words, a CE subfield may be omitted for the TRN field corresponding to each case.

Furthermore, in Section 4.3.1. to Section 4.3.3., the number of Golay sequences for each structure may be set as a variable number. And, the number of AGC subfields and TRN-T/R subfields may also be respectively set as variable numbers.

Figure 44:
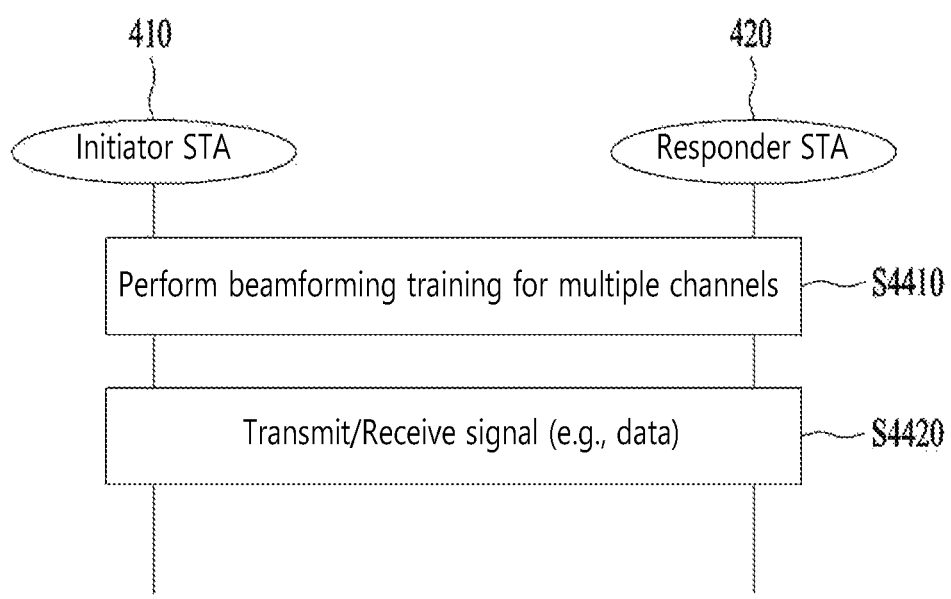
FIG. 44 is a diagram showing a method for transmitting a signal through multiple channels by two STAs according to an exemplary embodiment of the present invention.

FIG. 44 is a diagram showing a method for transmitting a signal through multiple channels by two STAs according to an exemplary embodiment of the present invention. Referring to FIG. 44, an STA that transmits a signal is referred to as an initiator STA (410), and an STA that receives the signal in response to the signal transmission is referred to a responder STA (420). At this point, each of the initiator STA (410) and the responder STA (420) may correspond to a PCP/AP STA or a Non-PCP/AP STA.

Additionally, for simplicity in the description, although the description presented below discloses only a structure of transmitting a signal for the initiator STA (410) and a structure of receiving a signal for the responder STA (420), in each of the following phases (or steps), which will hereinafter be described in detail, the initiator STA (410) (or the responder STA (420)) may not only transmit a signal but may also receive a signal.

Additionally, diverse beamforming training methods that have already been described above in detail may be applied as the beamforming training method for multiple channels shown in FIG. 44. For simplicity in the description of the present invention, although only one beamforming training method, among the diverse beamforming training methods that are described above for the configuration of the present invention, is presented as a limited example of the present invention, it will be apparent that the configuration that will be described below may also be extendedly applied to the other beamforming training methods that are described above.

In step S4410, the initiator STA (410) performs a beamforming training process for multiple channels that intend to transmit a signal to the responder STA (420). As a method for performing this process, the initiator STA (410) may transmit one or more PPDUs to the responder STA (420). At this point, each of the PPDUs may have different structures depending upon whether a signal transmission method the multiple channels is channel bonding or channel aggregation.

More specifically, if the method for transmitting the signal performed through the multiple channels is channel aggregation, the beamforming training may be performed for the multiple channels by having the initiator STA (410) transmit the PPDU according to FIG. 28 to the responder (420). At this point, the PPDU may include an L-STF field, an L-CE field, an L-Header field, an EDMG Header A field, a BRP field, and a TRN field, which are duplicated and transmitted for each of the aggregated channels. Furthermore, the above-mentioned fields may be configured within the PPDU format by the above-described order.

Based on a comparison between the above-described PPDU configuration and the PPDU format of FIG. 10, when performing the channel aggregation transmission, the PPDU for performing the beamforming training on the multiple channels may not include an EDMG-STF field, an EDMG-CE field, and an EDMG Header-B field.

At this point, the channel aggregation may include a 2-channel aggregation or a 4-channel aggregation.

Alternatively, if the method for transmitting the signal performed through the multiple channels is channel bonding, the beamforming training may be performed for the multiple channels by having the initiator STA (410) transmit the PPDU according to FIG. 29 to the responder (420). At this point, in case the method for transmitting the signal performed through the multiple channels is channel bonding, the PPDU may include an L-STF field, an L-CE field, an L-Header field, an EDMG Header A field, and a BRP field, which are duplicated and transmitted for each of the bonded channels, and a TRN field, which is transmitted through the entire bandwidth of the bonded channels. Furthermore, the above-mentioned fields may be configured within the PPDU format by the above-described order. Based on a comparison between the above-described PPDU configuration and the PPDU format of FIG. 10, when performing the channel bonding transmission, the PPDU for performing the beamforming training on the multiple channels may not include an EDMG-STF field, an EDMG-CE field, and an EDMG Header-B field.

Based on a comparison between the above-described PPDU configuration and the PPDU format of FIG. 10, when performing the channel bonding transmission, the PPDU for performing the beamforming training on the multiple channels may not include an EDMG-STF field, an EDMG-CE field, and an EDMG Header-B field.

At this point, the channel bonding may include a 2-channel bonding or a 4-channel bonding.

In step S4420, based on the beamforming training result of the beamforming training process, which is performed in step S4410, the initiator STA (410) transmits a signal to the responder STA (420) through multiple channels. In response to this, the responder STA (420) receives a signal that is transmitted from the initiator STA (410) through multiple channels based on the beamforming training result of the beamforming training process, which is performed in step S4410.

5. Device Configuration

Figure 45:
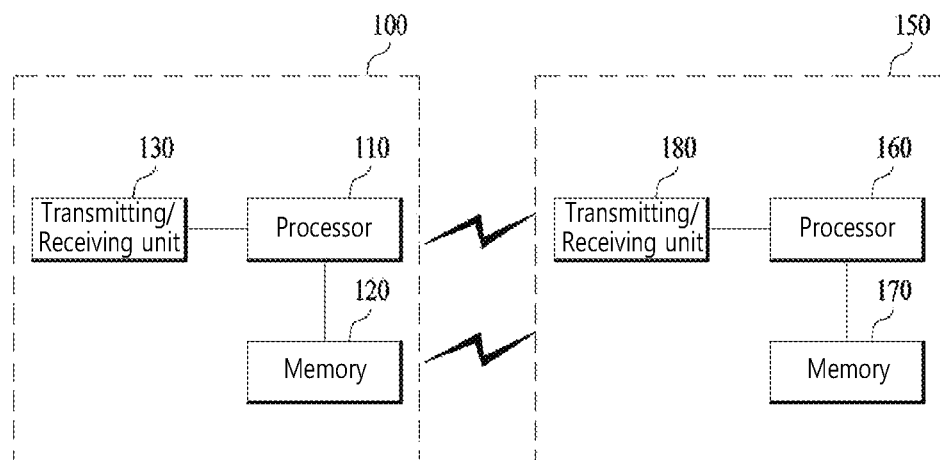
FIG. 45 is a diagram describing a device for implementing the above-described method.

FIG. 45 is a diagram describing a device for implementing the above-described method.

A wireless device (100) of FIG. 45 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using/based on the same method as presented herein.

What is claimed is:

1. A method for transmitting a signal by a first station (STA) to a second station (STA) through multiple channels in a wireless LAN (WLAN) system, comprising:
    performing a beamforming training procedure on the multiple channels for the second STA by transmitting a Physical Protocol Data Unit (PPDU) through the multiple channels to the second STA; and
    transmitting the signal through the multiple channels to the second STA based on the beamforming training procedure,
    wherein in case the PPDU is transmitted based on a channel aggregation, the PPDU includes a Legacy Short Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated aggregated channels included in the multiple channels, and the PPDU further includes a first Training (TRN) field having a gap configured between the aggregated channels, wherein in case the PPDU is transmitted based on a channel bonding, the PPDU includes a L-STF field, a L-CE field, a L-Header field, an EDMG Header A field, and a BRP field, which are duplicated for bonded channels included in the multiple channels, and the PPDU further includes a second TRN field being transmitted through an entire bandwidth of the bonded channels, and wherein the first TRN field and the second TRN field are differently configured based on whether the PPDU is transmitted based on the channel aggregation or the channel bonding, respectively.

2. The method of claim 1,
wherein the PPDU is configured by an order of the L-STF field, the L-CE field, the L-Header field, the EDMG Header A field, the BRP field, and the first TRN field in a time domain in the case where the PPDU is transmitted based on the channel aggregation, and wherein the PPDU is configured by an order of the L-STF field, the L-CE field, the L-Header field, the EDMG Header A field, the BRP field, and the second TRN field in the time domain in the case where the PPDU is transmitted based on the channel bonding.

3. The method of claim 1, wherein, in case the PPDU is transmitted based on the channel bonding, the channel bonding includes 2-channel bonding to 4-channel bonding.

4. The method of claim 1, wherein, in case the PPDU is transmitted based on the channel aggregation, the channel aggregation includes a 2-channel aggregation or a 4-channel aggregation.

5. The method of claim 1, wherein the PPDU does not include an EDMG-STF field, an EDMG-CE field, and an EDMG Header-B field.

6. A station device for transmitting a signal through multiple channels in a wireless LAN (WLAN) system, comprising:
a transmitting/receiving unit having one or more radio frequency (RF) chains and being configured to transmit/receive a signal to/from another station device; and
a processor being operatively connected to the transmitting/receiving unit and performing signal processing of the signal transmitted/received to/from the other station device,
wherein the processor is configured:
to a perform beamforming training procedure on the multiple channels for the other station device by transmitting a Physical Protocol Data Unit (PPDU) through the multiple channels to the other STA, and
to transmit the signal through the multiple channels to the other station device based on the beamforming training procedure, wherein in case the PPDU is transmitted based on a channel aggregation, the PPDU includes a Legacy Short Training Field (L-STF) field, a Legacy Channel Estimation (L-CE) field, a Legacy Header (L-Header) field, an Enhanced Directional Multi Gigabit Header A (EDMG Header A) field, and a Beam Refinement Protocol (BRP) field, which are duplicated for aggregated channels included in the multiple channels, and the PPDU further includes a first Training (TRN) field having a gap configured between the aggregated channels, wherein in case the PPDU is transmitted based on a channel bonding, the PPDU includes a L-STF field, a L-CE field, a L-Header field, an EDMG Header A field, and a BRP field, which are duplicated for bonded channels included in the multiple channels, and the PPDU further includes a second TRN field being transmitted through an entire bandwidth of the bonded channels, and wherein the first TRN field and the second TRN field are differently configured based on whether the PPDU is transmitted based on the channel aggregation or the channel bonding, respectively.

7. The station device of claim 6,
wherein the PPDU is configured by an order of the L-STF field, the L-CE field, the L-Header field, the EDMG Header A field, the BRP field, and the first TRN field in a time domain in the case where the PPDU is transmitted based on the channel aggregation, and wherein the PPDU is configured by an order of the L-STF field, the L-CE field, the L-Header field, the EDMG Header A field, the BRP field, and the second TRN field in the time domain in the case where the PPDU is transmitted based on the channel bonding.

8. The station device of claim 6, wherein, in case the PPDU is transmitted based on the channel bonding, the channel bonding includes 2-channel bonding to 4-channel bonding.

9. The station device of claim 6, wherein, in case the PPDU is transmitted based on the channel aggregation, the channel aggregation includes a 2-channel aggregation or a 4-channel aggregation.

10. The station device of claim 6, wherein the PPDU does not include an EDMG-STF field, an EDMG-CE field, and an EDMG Header-B field.

11. The method of claim 1,
wherein the channel bonding is related to the PPDU being transmitted through multiple continuous channels, and
wherein the channel aggregation is related to the PPDU being transmitted through non-continuous channels.

12. The station device of claim 6,
wherein the channel bonding is related to the PPDU being transmitted through multiple continuous channels, and
wherein the channel aggregation is related to the PPDU being transmitted through non-continuous channels.

* * * * *